US011300324B2

(12) United States Patent
O'Keeffe et al.

(10) Patent No.: US 11,300,324 B2
(45) Date of Patent: Apr. 12, 2022

(54) SYSTEM FOR WATER MANAGEMENT, AND RELATED METHODS

(71) Applicant: Symmons Connected, LLC., Braintree, MA (US)

(72) Inventors: Timothy O'Keeffe, Hingham, MA (US); Elizabeth Mercurio, Hingham, MA (US); Robert W. Lancelot, Duxbury, MA (US); Anthony Cipolla, Quincy, MA (US); Fernando Castro, Westwood, MA (US); William Jerome, Jr., Wrentham, MA (US)

(73) Assignee: Symmons Connected, LLC., Braintree, MA (US)

( * ) Notice: Subject to any disclaimer, the term of this patent is extended or adjusted under 35 U.S.C. 154(b) by 299 days.

(21) Appl. No.: 16/727,125

(22) Filed: Dec. 26, 2019

(65) Prior Publication Data

US 2020/0340711 A1    Oct. 29, 2020

Related U.S. Application Data

(62) Division of application No. 16/429,893, filed on Jun. 3, 2019, now Pat. No. 10,533,770.
(Continued)

(51) Int. Cl.
*F24H 9/20* (2006.01)
*F24H 1/08* (2022.01)
(Continued)

(52) U.S. Cl.
CPC ............ *F24H 9/2007* (2013.01); *F24H 1/08* (2013.01); *G01M 3/2876* (2013.01); *G06F 17/11* (2013.01); *G06K 9/6267* (2013.01)

(58) Field of Classification Search
CPC .................................................... F24H 9/2007
See application file for complete search history.

(56) References Cited

U.S. PATENT DOCUMENTS

| | | | | |
|---|---|---|---|---|
| 4,832,259 A | * | 5/1989 | Vandermeyden | ....... F23N 1/082 236/20 R |
| 5,056,712 A | * | 10/1991 | Enck | ................. G05D 23/1904 236/20 R |
| 2016/0273787 A1 | * | 9/2016 | Baasch Sorensen | ..... G01F 1/34 |

* cited by examiner

*Primary Examiner* — Nathaniel Herzfeld
(74) *Attorney, Agent, or Firm* — Goodwin Procter LLP

(57) ABSTRACT

A system and method for monitoring and managing water delivered to users hydraulically connected via a dedicated conduit loop to a water supply source and a water heating unit via a dedicated conduit loop, the system including a mixing valve(s) hydraulically connected to the dedicated conduit loop; a first set of sensing devices operatively coupled to an input and an output of the mixing valve, wherein each sensing device of the first set is adapted to generate and transmit sensed data signals; a recirculation pump hydraulically coupled to the dedicated conduit loop; a second set of sensing devices operatively coupled to selected portions of the dedicated conduit loop, wherein each sensing device of the second set is adapted to generate and transmit sensed data signals; a pressure regulating or balancing device(s) hydraulically coupled to the dedicated conduit loop; a data collection system for receiving and storing sensed data transmitted by the first set of sensing devices and/or the second set of sensing devices; and a system controller for comparing sensed data with rules, data patterns, data signatures, relationships between data, or mathematically calculated values associated with water event anomalies and generating and transmitting a notification, a warning, and/or an alert if the comparison is suggestive of a water event anomaly.

19 Claims, 13 Drawing Sheets

Related U.S. Application Data

(60) Provisional application No. 62/839,238, filed on Apr. 26, 2019.

(51) Int. Cl.
*G06F 17/11* (2006.01)
*G06K 9/62* (2022.01)
*G01M 3/28* (2006.01)

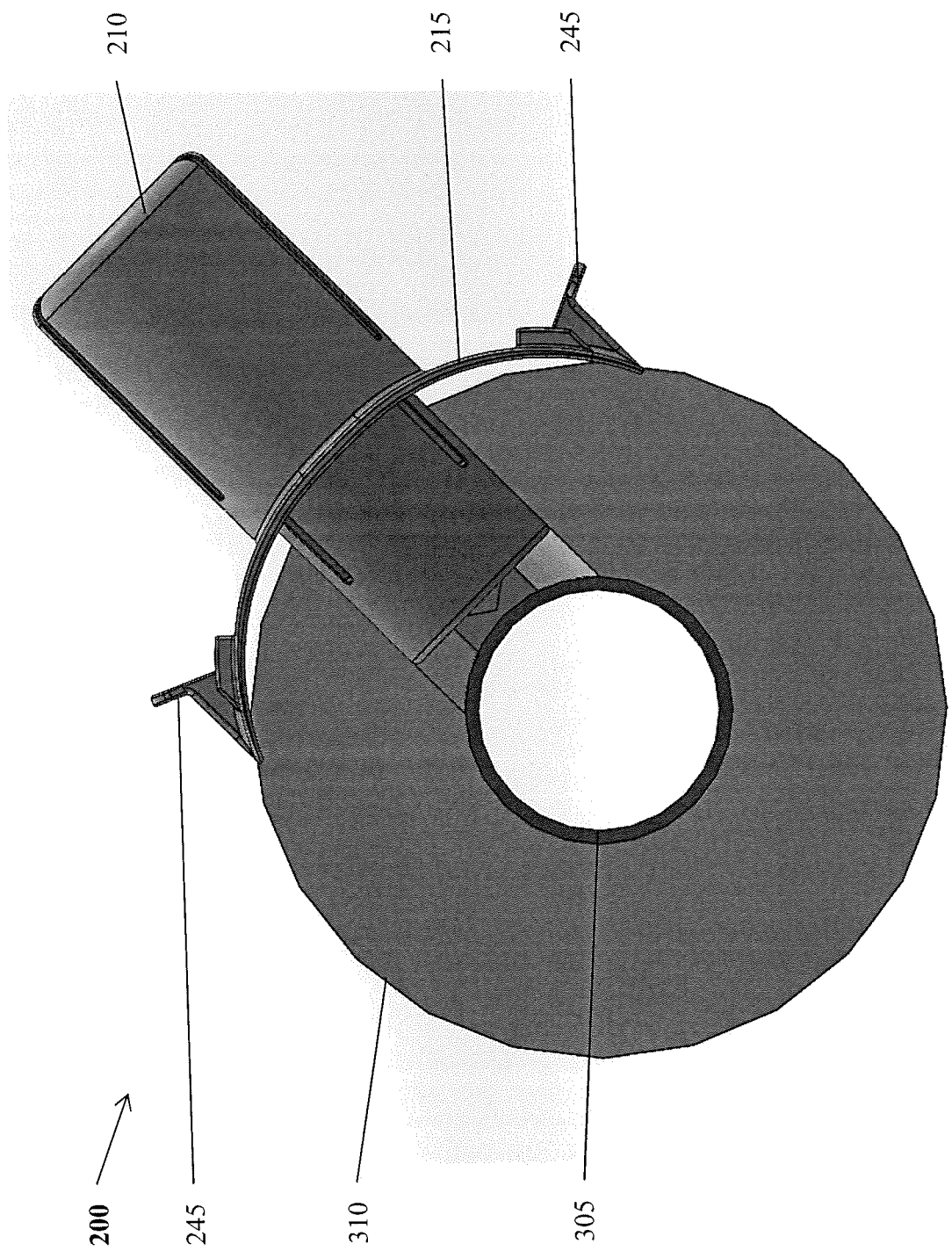

SYSTEM FOR WATER MANAGEMENT, AND RELATED METHODS

CROSS-REFERENCE TO RELATED APPLICATION

This application is a divisional of U.S. patent application Ser. No. 16/429,893, filed on Jun. 3, 2019, which claims priority to U.S. Provisional Patent Application No. 62/839,238 filed on Apr. 26, 2019, the entire contents of which are incorporated herein in their entirety.

FIELD OF INVENTION

Systems for and methods of managing water in, for example, hospitality, commercial, industrial, institutional, and domestic structures are described and, more specifically, systems and methods that manage water using water temperature, ambient temperature, water pressure, ambient humidity, water (leak) detection, and/or flow data and artificial intelligence, which provide real-time and historical information, notifications, alerts, and alarms, and, optionally, corrective action.

BACKGROUND OF INVENTION

Commercial brands, owners, and property managers of, for example, commercial properties offering hospitality services have become more cognizant of the role water plays in the customer experience. Moreover, brands, owners, and property managers are more aware of the impact of a negative experience advertised on social media may have, as well as the direct impact a direct experience may have on occupancy and room rates. Heretofore, these players have regarded water as a relatively inexpensive commodity. Thus, the costs associated with water have mainly been focused on usage. However, such costs only make up a portion of the equation.

Indeed, according to a social media study of negative reviews of American hotels, after problems associated with a hotel's Wi-Fi network, the second largest complaint category comprises complaints about water. More particularly, about 90 percent of the water complaints revolve around the shower, viz., inconsistent water pressure, insufficient hot water available, and other, general shower issues. In short, water—and, more particularly, the delivery of hot water to a hotel guest—remains high on the list of pain points for brands, owners, and property managers. Moreover, well beyond the relatively inexpensive cost of a gallon of heated water, the inability to deliver heated water to a hotel guest in a manner and at a time desired by that hotel guest may result in guest complaints, in adverse publicity (e.g., via social media, word of mouth, and the like), and in monetary reimbursements to guests.

Guest complaints about a (e.g., hot) water issue may result in an immediate economic loss to the brands, owners, and property managers due to the property manager having to reimburse the amount of the hotel guest's night stay. Furthermore, the complaint may affect the dissatisfied hotel guest's future decision on where to stay. Moreover, if the dissatisfied hotel guest shared her dissatisfaction with others (e.g., via social media), such bad publicity may affect the brand's reputation, which may affect the decisions of other potential guests. As a result, the costs of delivering a gallon of hot water to a hotel guest may far exceed the costs associated with just heating the water.

BRIEF SUMMARY OF INVENTION

In a first aspect, embodiments of the invention generally relate to a system for monitoring and managing water delivered to users hydraulically connected via a dedicated conduit loop to a water supply source and a water heating unit via the dedicated conduit loop (e.g. a riser). In some embodiments, the system includes one or more mixing valves hydraulically connected to the dedicated conduit loop; a first set of sensing devices operatively coupled to an input and an output of the mixing valve(s), wherein each sensing device of the first set is adapted to generate and transmit sensed data signals; a recirculation pump hydraulically coupled to the dedicated conduit loop; a second set of sensing devices operatively coupled to selected portions (e.g., a supply conduit and a return conduit) of the dedicated conduit loop, wherein each sensing device of the second set is adapted to generate and transmit sensed data signals; a pressure regulating or balancing device hydraulically coupled to the dedicated conduit loop; a data collection system for receiving and storing sensed data transmitted by the first set of sensing devices and/or the second set of sensing devices; and a system controller for comparing sensed data with rules, data patterns, data signatures, relationships between data, and/or a value calculated mathematically associated with water event anomalies and for generating and transmitting a notification, a warning, and/or an alert if the comparison of sensed data with the rules, data patterns, data signatures, relationships between data, and/or value calculated mathematically is suggestive of a water event anomaly. In other applications, the system controller further controls operation of the recirculation pump to control movement of water through the mixing valve and/or further controls operation of the pressure regulating or balancing device to control flow or pressure in the dedicated conduit loop.

In some variations, each of the first set of sensing devices and the second set of sensing devices may be adapted to sense a temperature in water flowing within a conduit. Furthermore, in some implementations, each of the first set of sensing devices and the second set of sensing devices may include a processing device having memory for storing water temperature data; a water temperature measuring circuit operatively coupled to the processing device and thermally couplable to an outer surface of a conduit or, alternatively, inserted within water flowing through the conduit, wherein the water temperature measuring circuit provides sensed water temperature data to the processing device; and a transmitting and receiving device operatively coupled to the processing device, wherein the transmitting and receiving device is structured and arranged to generate and transmit water temperature data signals. In some variations, each of the first set of sensing devices and the second set of sensing devices further includes a temporary power source operatively coupled to the processing device and an indicator operatively coupled to the processing device. In some implementations, the first set of sensing devices and/or the second set of sensing devices may also include one or more of: a water leakage sensing device operatively coupled to the processing device, a humidity sensing device operatively coupled to the processing device, and/or an ambient temperature sensing device operatively coupled to the processing device.

In some implementations, the system may include a user interface operatively coupled to the data collection system and to the system controller via at least one communication network. For example, the user interface may be structured and arranged to perform one or more of the following: modify a configuration, a function, and/or a parameter of the first set of sensing devices and/or of the second set of sensing devices; enable/disable at least one of the first set of sensing devices or the second set of sensing devices; install/ uninstall at least one of the first set of sensing devices or the second set of sensing devices; and/or view sensed data from at least one of the first set of sensing devices or the second set of sensing devices.

In some implementations of the present invention, the system may also include one or more external data storage devices for storing data from other sources. Such data may include local weather data, hotel occupancy, guest complaints, and/or average daily occupancy rate tracking data.

In a second aspect, embodiments of the invention generally relate to a method of monitoring and managing water delivery to users hydraulically connected to a water supply source and a water heating unit via a dedicated conduit loop, which may be hydraulically coupled to a recirculation pump and a pressure regulating or balancing device. In some embodiments, the method includes receiving and storing, in a data collection system having a memory, sensed data signals from a first set of sensing devices and/or from a second set of sensing devices, wherein the first set of sensing devices is operatively coupled to an input and an output of a mixing valve(s) and wherein the second set of sensing devices is operatively coupled to selected portions of the dedicated conduit loop; identifying a water event occurrence; logically associating the water event occurrence with sensed data signals from the first set of sensing devices and/or logically associating the water event occurrence with sensed data signals from the second set of sensing devices; classifying, using such logical associations, the water event occurrence as an anomaly based on rules, a corresponding data pattern, a corresponding data signature, a corresponding relationship between data, or a value calculated mathematically; and processing, using such classification, subsequently sensed data signals received from the first set of sensing devices and from the second set of sensing devices to identify the corresponding sensed data pattern of the anomaly. In some applications, the method further includes generating and transmitting, based on the identified corresponding sensed data pattern of the anomaly, a notification, a warning, and/or an alert if the comparison of sensed data to the rules, corresponding data pattern, corresponding data signature, corresponding relationship between data, and/or value calculated mathematically is suggestive of a likelihood of occurrence of a water event anomaly. In some variations, the sensed data signals from the first set of sensing devices and/or from the second set of sensing devices include water temperature data signals.

In some implementations, the method may also include one or more of the following: receiving and storing data signals in a local memory during a loss of connectivity with the data collection system and transmitting the data signals stored in the local memory when connectivity is restored; receiving and storing water leakage data signals from the first set of sensing devices and/or from the second set of sensing devices; receiving and storing humidity data signals from the first set of sensing devices and/or from the second set of sensing devices; receiving and storing ambient temperature data signals from an ambient temperature sensing device; receiving and storing data from external sources (e.g., local weather data, hotel occupancy, or average daily occupancy rate tracking data); and/or further comprising receiving and storing data including a date, a time, a sensor identifier, and/or a duration since a last condition change.

In a third aspect, embodiments of the invention generally relate to a method of installing a system for monitoring and managing water delivered to users hydraulically connected to a water supply source and a water heating unit via a dedicated conduit loop hydraulically coupled to a recirculation pump and a pressure regulating or balancing device. In some embodiments, the method includes operatively coupling a first set of sensing devices to an input and an output of a mixing valve(s), each sensing device of the first set of sensing devices may include a corresponding signal transmitting device for generating and transmitting sensed data signals; operatively coupling a second set of sensing devices to selected portions of the dedicated conduit loop, each sensing device of the second set of sensing devices may include a corresponding signal transmitting device for generating and transmitting sensed data signals; providing a data collection system for storing received sensed data signals; providing a system controller for comparing sensed data with at least one of rules, a corresponding data pattern, a corresponding data signature, a corresponding relationship between data, or a value calculated mathematically associated with water event anomalies and for generating and transmitting a notification, warning, and/or an alert if the comparison of sensed data with the rules, the corresponding data pattern, the corresponding data signature, the corresponding relationship between data, or the value calculated mathematically associated with water event anomalies is suggestive of a water event anomaly. In some variations, the sensed data signals of the first set of sensing devices and the sensed data signals of the second set of sensing devices may include data signals of a temperature of water flowing within a conduit.

In some applications, operatively coupling the second set of sensing devices to selected portions of the dedicated conduit loop may also include coupling a first sensing device of the second set to a supply portion of the dedicated conduit loop and coupling a second sensing device of the second set to a return portion of the dedicated conduit loop. In some variations, the method may further include one or more of the following: operatively coupling a third sensing device to selected portions of the dedicated conduit loop, wherein the third sensing device may include a signal transmitting device for generating and transmitting sensed humidity signals, water leakage signals, and/or ambient temperature signals; and operatively connecting a user interface to the system controller via at least one communication network.

In some implementations, the method may include controlling, by the system controller, operation of a recirculation pump(s), a pressure regulating or balancing device(s), or other system components.

In a fourth aspect, embodiments of the invention generally relate to an article of manufacture having computer-readable program portions embedded thereon. In some embodiments, the embedded portions include instructions for receiving and storing, in a data collection system having a memory, sensed data signals from a first set of sensing devices operatively coupled to an input and an output of a mixing valve(s) and/or from a second set of sensing devices operatively coupled to selected portions of the dedicated conduit loop (e.g., the supply conduit and the return conduit); identifying a water event occurrence; logically associating the water event occurrence with sensed data signals from the first set of sensing devices and/or logically associating the water event occurrence with sensed data signals from the second set of sensing devices; classifying, using such logical associations, the water event occurrence as an anomaly based on rules, a corresponding data pattern, a corresponding data signature, a corresponding relationship between data, and/or a value calculated mathematically; and processing, using such classification, subsequently sensed data signals received from the first set of sensing devices and from the second set of sensing devices to identify the anomaly. In some variations, the embedded portions may further include instructions for, based on the identified corresponding sensed data pattern of the anomaly, generating and transmitting a notification, warning, and/or an alert of the likelihood of occurrence of the anomaly.

BRIEF DESCRIPTION OF DRAWINGS

Various features and advantages of the present invention, as well as the invention itself, can be more fully understood from the following description of the various embodiments, when read together with the accompanying drawings, in which:

FIG. 3D shows a cross-sectional view of the mounting system shown in FIG. 3A mounted on an insulated conduit in accordance with some embodiments of the present invention;

DETAILED DESCRIPTION OF INVENTION

Although the invention will be described in the context of water management in hotels and similar hospitality environments, those of ordinary skill in the art can appreciate that the systems and methods described herein may be applied in residential, industrial, institutional, and other commercial settings in which the structures and plumbing differ from those commonly found in connection with a hotel, motel, travel lodge, or other business providing short- or long-term accommodations to guests.

Water management is made difficult due to the lack of information regarding the current or historical state of the plumbing system, due to systems that have not been built to match the plumbing system design, and because plumbing systems, unlike some other building systems (e.g., electrical systems) age and wear over time due to the impact of water on the system, thermal expansion and contraction, mineral and other deposits, and many other factors. In short, a new or existing plumbing system routinely comes with known and unknown faults, omissions, and/or flaws. The problems can be exacerbated due to periodic or chronic repairs on the system (e.g., a plumber servicing one system component may adversely impact another system component without being aware of it). Whereas the former fault(s) may be easily identified, e.g., by the presence of water readily visible elsewhere in the hotel, the secondary fault(s) may be less easy to identify or to diagnose. Indeed, the impact of a quick or short-term fix may resolve a water delivery issue in one part of the hotel for a period of time; however, the fix may also have unforeseen impacts on other parts of the hotel plumbing infrastructure.

As a result, property operators and maintenance personnel at the properties often must operate their hotel with incomplete knowledge, until, with time, they are able to identify, troubleshoot, and repair recurring problems deleteriously affecting the plumbing system. More or equally as important, however, is accomplishing the identification, troubleshooting, and repair of the plumbing system before hotel guests know that there is a problem. To this end, technology, smartly applied, is desirable.

Figure 1:
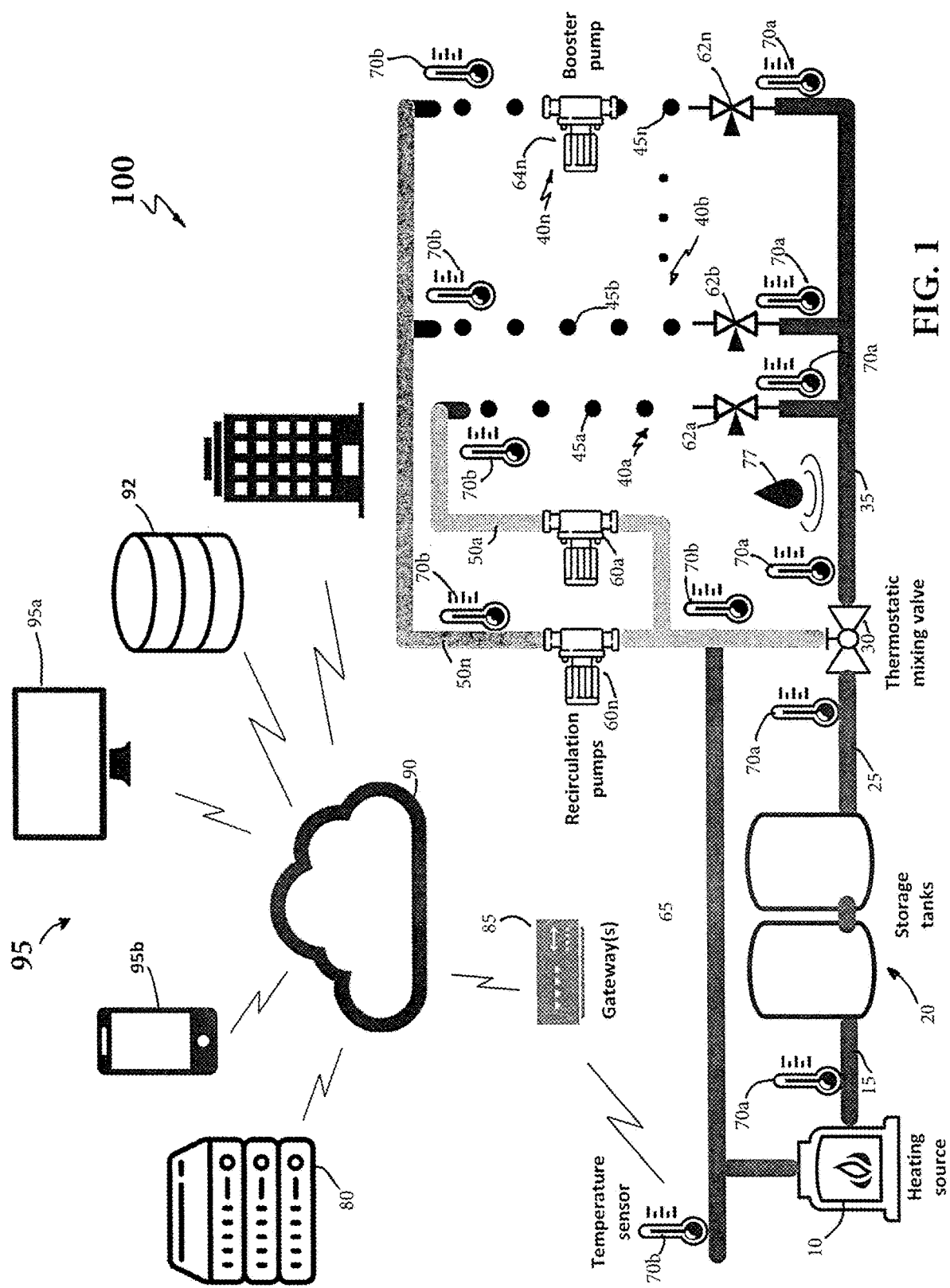
FIG. 1 shows an illustrative system for monitoring and managing water delivered to a plurality of users in accordance with some embodiments of the present invention.

Referring to FIG. 1, an exemplary system 100 for monitoring and managing delivery of water to users (e.g., hotel guests) is shown. In some embodiments, the system 100 may include a heating source (e.g., a water heater) 10, water storage tank(s) 20, a thermostatic mixing valve(s) 30, and a plurality of recirculation pumps 60a . . . 60n. In some implementations, each of the heating source 10, water storage tank(s) 20, thermostatic mixing valve(s) 30, and recirculation pumps 60a . . . 60n is hydraulically connected in a closed system of conduits (e.g., water pipes). For example, the outlet(s) of the heating source 10 may be hydraulically coupled to an inlet(s) of the storage tank(s) 20 via a first conduit(s) 15; an outlet(s) of the water storage tank(s) 20 may be hydraulically coupled to an inlet(s) of the thermostatic mixing valve(s) 30 via a second conduit(s) 25; and the outlet(s) of the thermostatic mixing valve(s) 30 may be hydraulically coupled to at least one dedicated conduit loop, e.g., at least one riser 40a . . . 40n, via a third conduit(s) 35. For the purpose of illustration and not limitation, the system 100 includes several dedicated conduit loops, which will be described as a plurality of risers 40a . . . 40n for delivering water to a number of hotel guests in specific areas on multiple floors within the structure.

Typically, within the plumbing infrastructure, risers 40a . . . 40n are structured and arranged in parallel flow arrangements, as closed loops, such that each riser 40a . . . 40n is dedicated to deliver and recirculate hot water to a fixed number of rooms on each floor of the building. Continuous flow in each loop ensures that hot water is immediately available to all hotel guests regardless of the distance of the guest from the heating source 10. Preferably, the rooms served by a particular riser 40a . . . 40n are located immediately above and/or immediately below each other on the various floors served by the riser 40a . . . 40n. For example, a first riser in a three-story structure may provide water to rooms 101 and 102 on the first floor, rooms 201 and 202 on the second floor, and rooms 301 and 302 on the third floor; a second riser may provide water to rooms 103 and 104 on the first floor, rooms 203 and 204 on the second floor, and rooms 303 and 304 on the third floor; and so forth. Those skilled in the art, however, can appreciate that a dedicated conduit loop could also service a single user.

In some implementations, the closed conduit loop of each riser 40a . . . 40n includes a set of conduits: a delivery or supply conduit 45a . . . 45n and a return conduit 50a . . . 50n. The delivery or supply conduit 45a . . . 45n provides hot water to a guest room(s) and the return conduit 50a . . . 50n returns unused hot water in the corresponding riser 40a . . . 40n to the heating source 10 or, in the alternative, in some applications, returns unused hot water in the riser 40a . . . 40n to the mixing valve 30. Typically, in some applications, desirable water temperatures may be kept between 115° F. and 130° F. Furthermore, in some implementations and typically, it may be desirable for hot water temperatures in a return conduit 50a . . . 50n to be within about 10 to 15° F. of the hot water temperatures in its paired delivery or supply conduit 45a . . . 45n.

A recirculation pump 60a . . . 60n may be integrated into the closed loop of each riser 40a . . . 40n to control the flow (and, hence, pressure) in the riser 40a . . . 40n and to recirculate the water in a desired fashion. In some implementations, the recirculation pump 60a . . . 60n may be actively controlled to control flow and/or pressure and to adjust the water temperature within the delivery or supply conduit 45a . . . 45n with the water temperature of the water within the return conduit 50a . . . 50n.

The mathematical difference between the hot water temperature in the delivery or supply conduit 45a . . . 45n compared to that in its paired return conduit 50a . . . 50n may be greater in older facilities and/or facilities with insufficient thermal insulation about the conduits. Larger differences may also occur, for example, as hot water demand increases or decreases, as a function of the operation of the recirculation pumps 60a . . . 60n, due to problems in the plumbing system design or implementation, and/or due to problems with other components integrated into the plumbing system.

In some implementations, the delivery or supply conduit 45a . . . 45n of each riser 40a . . . 40n may also be hydraulically coupled to the third conduit(s) 35 via a pressure or flow regulation or balancing device 62a . . . 62n. A known phenomenon associated with a structure having multiple risers 40a . . . 40n is that risers 40a closer to the hot water source 10 and the mixing valve 30 can receive more water and/or higher temperature water to the detriment of risers 40n located farther from the hot water source 10 and the mixing valve 30. In order to balance the distribution of hot water among the risers 40a . . . 40n, pressure or flow regulating or balancing devices 62a . . . 62n may be integrated or incorporated into each riser 40a . . . 40n. Such devices 62a . . . 62n are configured to alter or adjust the flow of hot water within a corresponding riser 40a . . . 40n to balance the distribution of water. This ensures that risers closer to the heating source 10 and the mixing valve 30 do not receive more or higher temperature water than risers farther away from the heating source 10 and the mixing valve 30.

Typically, when a hotel is constructed and at certain load demands on the system 100, the distribution of hot water in the risers 40a . . . 40n is optimally balanced. This balancing, however, is static and cannot be adjusted to match dynamic loading of the system 100. Hence, over time, when more hot water is used in one riser or first combination of risers versus another riser or second combination of risers, the balance becomes less than optimal. As a result, regulating or balancing devices 62a . . . 62n may be incorporated into corresponding delivery conduits 45a . . . 45n to permit periodic optimization, i.e., balancing, to the hot water supplied to each riser 40a . . . 40n. Optionally, an active control system may be incorporated into the regulating or balancing devices 62a . . . 62n so that balancing can be performed, e.g., continuously or periodically, to dynamically alter the flow of water through each of the risers 40 a . . . 40n to account for changing conditions and water demand as described further herein.

Conventionally, each riser 40a . . . 40n in the system 100 that provides water to hotel guests on the seventh floor or higher, may include at least one booster pump 64a . . . 64n fluidically coupled to a corresponding delivery conduit 45a . . . 45n. Booster pumps 64a . . . 64n essentially pull water to a greater height, increasing the pressure of the water as it passes through the booster pump 64a . . . 64n. Optionally, an active control system may be incorporated into the booster pump 64a . . . 64n so that water delivery and pressure on higher floors, i.e., at or above the seventh floor, can be regulated.

To complete an illustrative embodiment of a typical riser 40a . . . 40n, the return conduit 50a . . . 50n may be hydraulically coupled to the inlet of a corresponding recirculation pump 60a . . . 60n, while the outlet of each recirculation pump 60a . . . 60n may be hydraulically coupled to a fourth conduit(s) 65. The fourth conduit(s) 65 may be hydraulically coupled to the heating source 10 and/or to the thermostatic mixing valve(s) 30.

As further shown in FIG. 1, sensing device modules or sensors 70a, 70b may be operatively coupled to the conduits 15, 25, 35, 65, as well as to the delivery conduits 45a . . . 45n and return conduits 50a . . . 50n of each riser 40a . . . 40n. As a result, in some embodiments, sensors 70a, 70b may be located on conduits disposed on or at the inlets and outlets of the heating source 10, the thermostatic mixing valve 30, and each recirculation pump 60a . . . 60n. Those of ordinary skill in the art can appreciate that one or more of the sensors 70a, 70b can be used to provide data for more than one location. For example, sensors 70b located on return conduits 50a . . . 50n may be used to provide (e.g., water temperature, ambient temperature, pressure, flow, and so forth) data on the return conduits 50a . . . 50n, as well as on or at the inlet of the corresponding recirculation pump 60a . . . 60n. Although an embodiment of the invention has been described that places sensors on portions of a plumbing system, other sensors may also be operatively installed within, for example, a kitchen, a swimming pool, a parking structure, as well as at discrete locations within a floor heating system, a snow melting system, and the like.

The physical location of the sensors 70a, 70b may be governed, in part, by one or more of: the accessibility of the conduits, the accessibility of the sensors 70a, 70b after they have been installed (e.g., for maintenance purposes, replacement, and the like), the related ease of installation and the degree of demolition associated with installation, and so forth. In some applications, especially for existing structures with existing plumbing systems, the sensors 70a, 70b may be non-invasive, while, in other applications, especially for new structures having new plumbing systems, the sensors 70a, 70b may be invasive.

Figure 2:
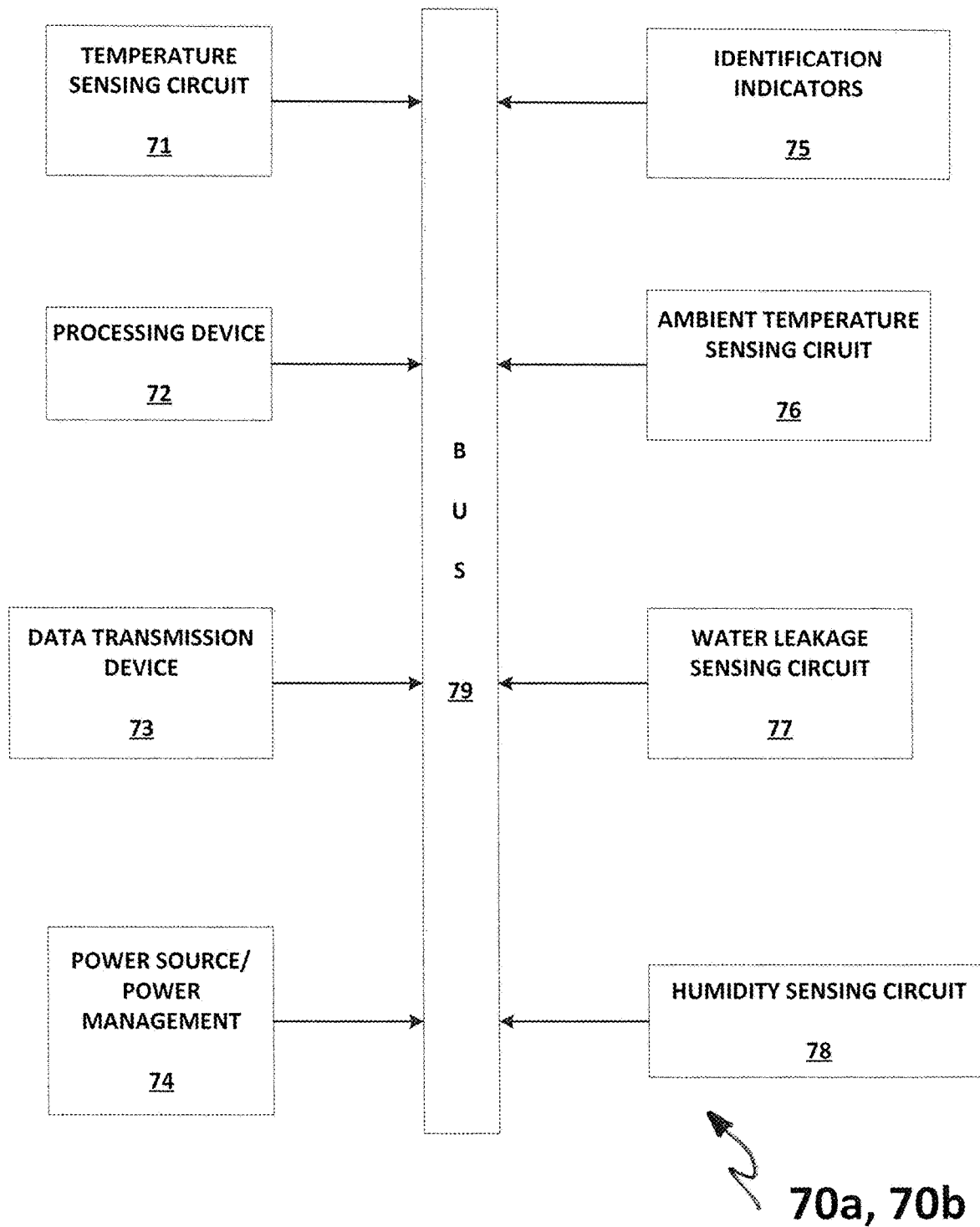
FIG. 2 shows a block diagram of a sensing device for monitoring water delivered to a plurality of users in accordance with some embodiments of the present invention.

Referring to FIG. 2, a block diagram of an exemplary sensor 70a, 70b is shown. In some embodiments, each sensor 70a, 70b may include a temperature sensing circuit 71, a processing device (e.g., a microprocessor 72), a data transmission device 73, a power source and power management 74, an identification indicator(s) 75, and an ambient temperature sensing circuit 76. In some applications, a water leakage sensing circuit 77 and/or a humidity sensing circuit 78 may be incorporated into or operatively coupled to the sensors 70a, 70b. The distribution of power and the transmission of data signals to and between each of the elements of the sensor 70a, 70b may occur on one or more busses 79. Although the invention will be described for a sensor 70a, 70b having a temperature sensing circuit 71, those of ordinary skill in the art can appreciate that a sensor module may also be structured and arranged to sense and provide data signals of pressure, flow, flow velocity, and other parameters of the hot water.

The temperature sensing circuit 71 may be invasive or non-invasive. For example, in some embodiments, a non-invasive temperature sensing circuit 71 may include a circuit that is capable of measuring a water temperature at or on the exterior (i.e., peripheral) surface of a conduit, e.g., a water pipe, that is indicative of the temperature of the water flowing through the conduit. In some variations, the temperature sensing circuit 71 may be removably attachable to a conduit. For example, the temperature sensing circuit 71 may be structured and arranged to be biased, such that the temperature sensing circuit 71 is brought into continuous physical contact with the exterior surface of the conduit. Alternatively, in other applications, an invasive temperature sensing circuit 71 may include an invasive sensor probe that is located within the conduit, such that the sensor probe of the temperature sensing circuit 71 is in direct contact with water flowing through the conduit.

Figure 3A:
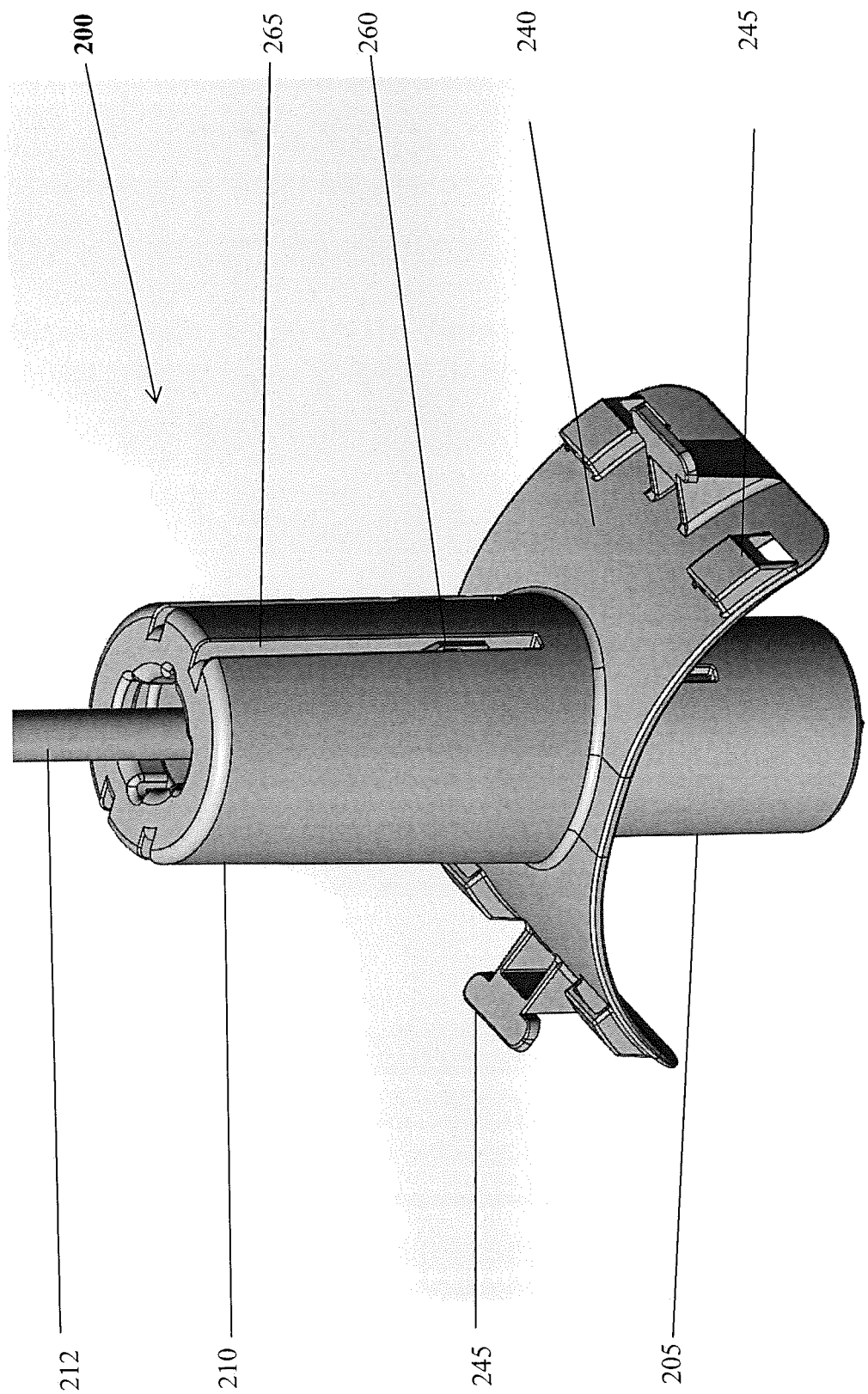
FIG. 3A depicts a side perspective view of a mounting system for mounting a temperature sensing circuit in accordance with some embodiments of the present invention.
Figure 3B:
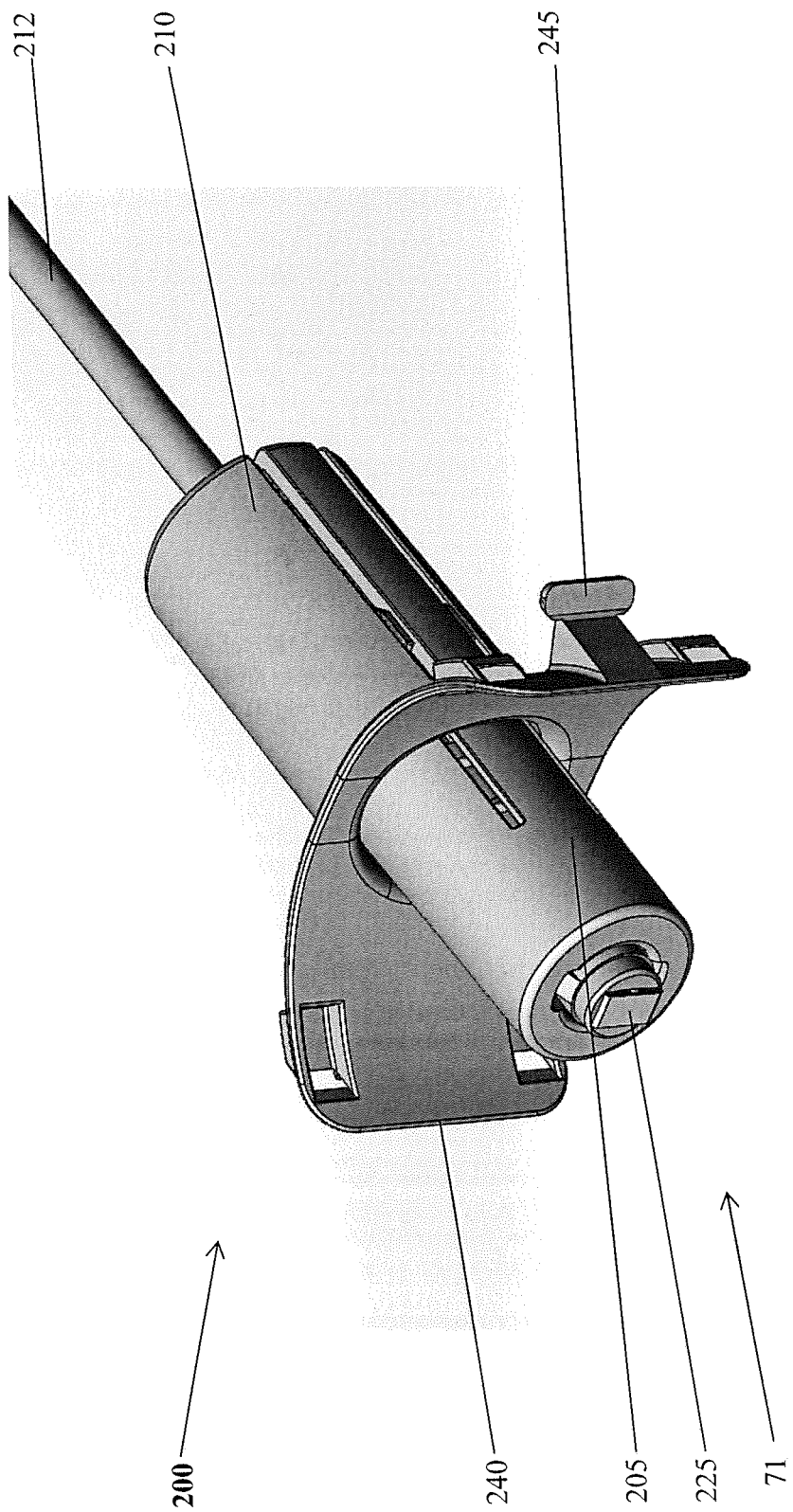
FIG. 3B depicts a bottom perspective view of the mounting system shown in FIG. 3A.
Figure 3C:
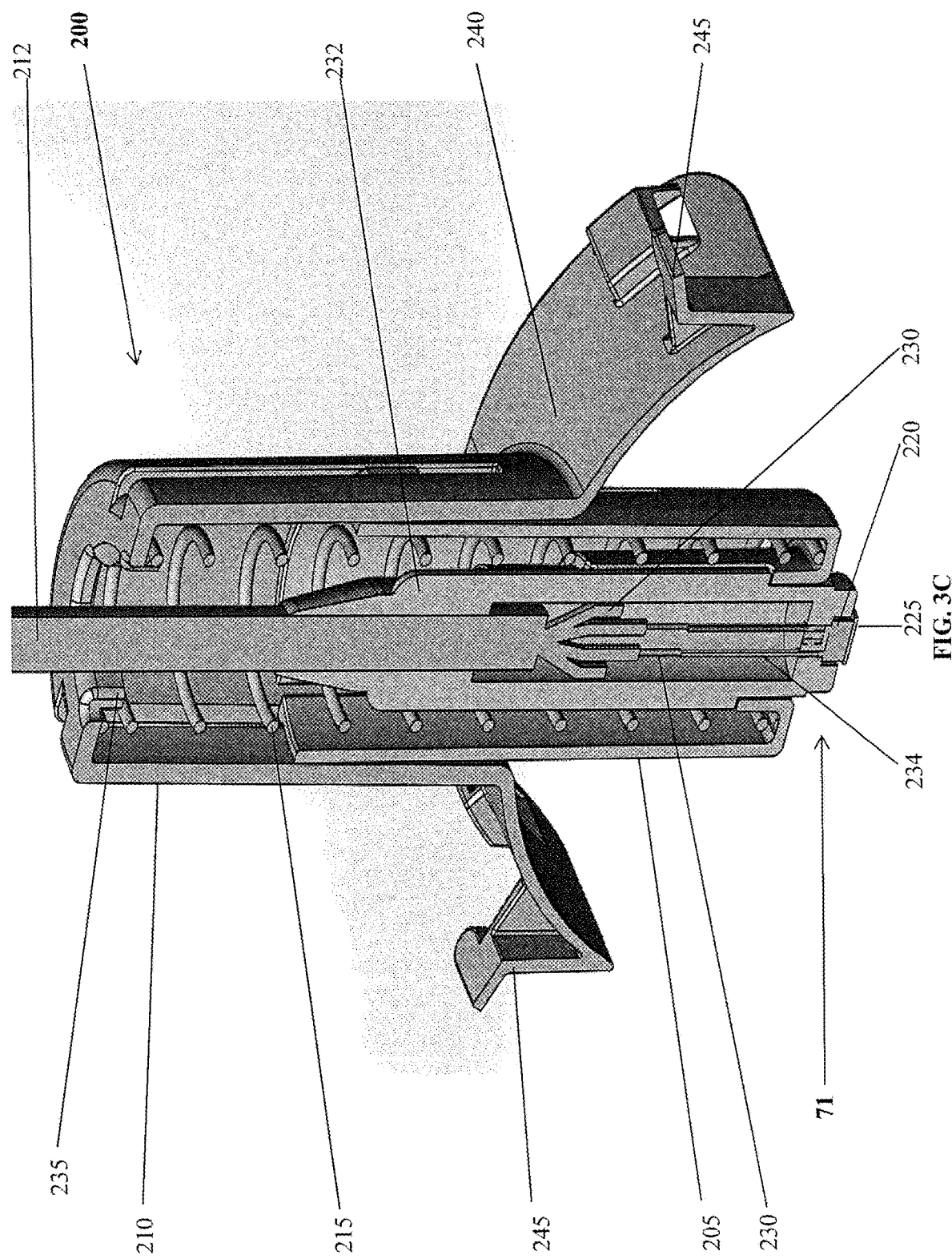
FIG. 3C depicts a cross-sectional view of the mounting system shown in FIG. 3A.
Figure 3E:
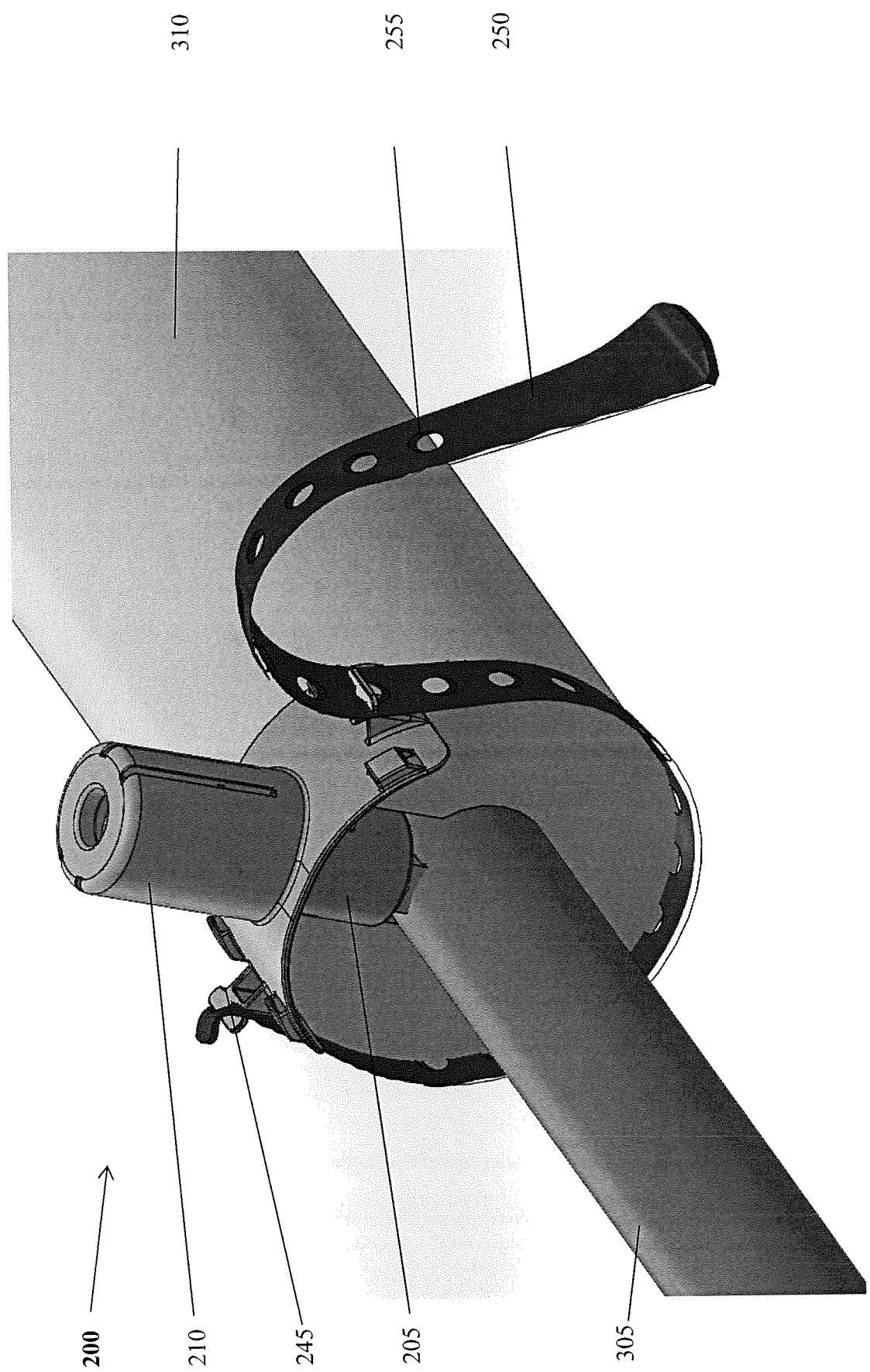
FIG. 3E shows a top perspective, partially cutaway view of the mounting system shown in FIG. 3A mounted on the insulation layer of a conduit in accordance with some embodiments of the present invention.

FIGS. 3A through 3C depict an exemplary mounting system 200 for mounting a temperature sensing circuit 71 to or proximate a conduit and, moreover, for biasing the temperature sensing circuit 71, such that the temperature sensing circuit 71 remains thermally coupled to the conduit, while FIGS. 3D and 3E depict an illustrative embodiment of a temperature sensing circuit 71 and mounting system 200 mounted to a conduit 305 that includes an insulation layer 310.

In some applications, the mounting system 200 may include a first or inner cylindrical portion 205 and a second or outer cylindrical portion 210. Although the invention will be described using portions 205, 210 that are substantially concentric, substantially coaxial, and substantially cylindrical in shape, those of ordinary skill in the art can appreciate that the inner and outer portions 205, 210 may have other geometries and shapes (e.g., rectangular, square, polygonal, elliptical, oval, and so forth). As shown in FIGS. 3A-3C, in some embodiments, the inner cylindrical portion 205 may include an open, distal end and a substantially closed proximal end at which the conductive temperature sensing circuit 71 may be securely and removably attached. The inner cylindrical portion 205 may be dimensioned and configured to freely slide, e.g., with minimal frictional resistance, within the inner plenum of the outer cylindrical portion 210. Furthermore, the open, distal end and the inner plenum of the inner cylindrical portion 205 may be adapted to accommodate a spring element 215. The spring element 215 may be provided to bias the temperature sensing circuit 71 against the outer peripheral surface of the conduit 305.

Preferably, the temperature sensing circuit 71 may include a housing 232, e.g., a plastic overmolding, that may be securely and removably attached to the inner cylindrical portion 205 at its proximal end. As shown in the embodiment of FIGS. 3A-3C, a cable 212 may be disposed through a first (e.g., distal) end of the housing 232. In some implementations, the cable 212 may be provided to transmit data signals and command signals, as well as electrical power, between the temperature sensing circuit 71 and the processing device 72. In some variations, the cable 212 may be a four-conductor cable having two twisted pairs of electrical connectors 230. The electrical connectors 230 may be operatively coupled to the main sensing portion 220 of the temperature sensing circuit 71 (e.g., via a plurality of leads 234).

At the second (e.g., proximal) end of the housing 232, the temperature sensing circuit 71 may be securely and removably installed within the housing 232. In some embodiments, the temperature sensing circuit 71 may include a main sensing portion 220, a thermal conductive (e.g., metal, aluminum, stainless steel, and the like) element 225, and a plurality of leads 234 that may be electronically and electrically coupled to corresponding pairs of electrical connectors 230 of the cable 212. In operations, the thermal conductive element 225 may be biased against some portion of the outer surface of the conduit 305 for the purpose of conducting the temperature at the outer surface of the conduit 305 to the main sensing portion 220. The main sensing portion 220 is structured and arranged to generate water temperature data signals using the conducted temperature readings from the thermal conductive element 225 and to transmit water temperature data signals to the processing device 72 via the electrical connectors 230. In some variations, the main sensing portion 220 may include memory to store water temperature data rather than or in addition to transmitting these data to the processing device 72. Temporary storage of data may occur by choice or automatically, for example, when connectivity with the processing device 72 and/or the communication network 90 is interrupted.

In some variations, the outer cylindrical portion 210 may include a substantially open proximal end and a substantially annular distal end. The substantially open proximal end may be adapted to accommodate the spring element 215 and the distal end of the inner cylindrical portion 205; the substantially annular distal end may be configured to provide an opening 235 through which the cable 212 can pass. Furthermore, the outer cylindrical portion 210 may be dimensioned and configured to allow the inner cylindrical portion 205 to freely slide, e.g., with minimal frictional resistance, within the inner plenum of the outer cylindrical portion 210. In some applications, the proximal end of the outer cylindrical portion 210 may be fixedly attached to an arcuate base portion 240 that is dimensioned and shaped to fit over and atop either an insulation layer 310 or over and atop an insulation donut that is adapted to fit around the outer peripheral surface of an uninsulated water conduit 305. A set of connecting elements 245 may be provided on the arcuate base portion 240, e.g., at opposing ends of the base portion 240.

As shown in FIG. 3E, in some embodiments, in order to maintain the thermal conductive elements 225 of the temperature sensing circuit 71 in physical contact with the outer surface of the conduit 305 and to ensure a desirable thermal coupling, a (e.g., leather, rubber, and the like) strap 250 having a plurality of openings 255 may be used in conjunction with the connecting elements 245. The strap 250 and connecting elements 245 are structured and arranged to provide or exert a biasing force to the inner cylindrical portion 205, e.g., via the spring element 215. More specifically, in some applications, the strap 250 is tightened and attached to the connecting elements 245, so as to cause the outer cylindrical portion 210 to compress the spring element 215. The compressed spring element 215 biases the inner cylindrical portion 205, so that the thermal conductive element 225 of the temperature sensing circuit 71 is forced or pressed against the exterior surface of the conduit 305, ensuring a good thermal coupling between the conduit 305 and the thermal conductive element 225 of the temperature sensing circuit 71.

In order to center the outer cylindrical portion 210 about the inner cylindrical portion 205 and to reduce relative twisting of the outer cylindrical portion 210 about the inner cylindrical portion 205, a plurality of pins 260 may be provided or formed on the outer peripheral surface of the inner cylindrical portion 205 and a corresponding plurality of slots 265 may be provided through the outer cylindrical portion 210. In operation, prior to biasing the spring element 215 and attaching the strap 250 to the connecting elements 245, slots 265 in the outer cylindrical portion 210 may be aligned with respective pins 260 in the inner cylindrical portion 205.

Although the mounting system 200 has been described and shown for application with a conduit 305 that includes a surrounding insulation layer 310, those of ordinary skill in the art can apply the teachings of this invention to attach a modified mounting system (e.g., an insulation donut) to a conduit 305 of any diameter that does or does not include an insulation layer 310. Whereas application of a mounting system 200 to an insulated conduit would require cutting or boring through the insulation layer 310 to expose the underlying conduit 305, no such cutting or boring would be necessary with an uninsulated conduit. Furthermore, although an embodiment of the present invention has been described that includes connecting elements 245 in combination with a tightening strap 250 to provide a compressive, biasing force, those of ordinary skill in the art can appreciate that in the plumbing and other fields there are a myriad of ways to attaching items to a circular pipe or conduit (e.g., a D-clamp, a U-clamp or U-bolt, a hook and pile system, and the like).

Referring to FIG. 2, whether the sensor 70a, 70b is invasive on non-invasive, the temperature sensing circuit 71 may further be configured to generate (e.g., water temperature) data signals and to transmit those signals to the processing device 72. In some variations, the processing device 72 may include memory, e.g., random access memory (RAM), for storing the (e.g., water temperature) data from the temperature sensing circuit 71. Advantageously, the processing device 72 of each sensor 70a, 70b may include a unique sensor identity to distinguish between sensors. As a result, the (e.g., water temperature) data can be associated with a specific sensor 70a, 70b at a known location on a known riser 40. The processing device 72 may further be capable of associating one or more of: the date, the time of day, the duration since the last temperature change, and such information with the received (e.g., water temperature) data signals from the water temperature sensing circuit 71.

In some embodiments, the data transmission device 73 may include a transmitting and receiving device, e.g., a transducer, capable of transmitting signals (e.g., by hard wire or wirelessly) via a gateway 85 and a communication network 90. For example, the processing device 72 may be connected via the data transmission device 73 to a gateway 85 and to a, e.g., cloud-based) communication network 90, such as the Internet, an Intranet, an Extranet, an Ethernet, or any other network that facilitates communication. Any number of application layer protocols may be used, including, for the purpose of illustration rather than limitation: RDP (Reliable Data Protocol), HTTP (Hyper Text Transfer Protocol), HTTPS (Hyper Text Transfer Protocol Secure), TLS/SSL (Transport Layer Security/Secure Sockets Layer), XML (Extensible Markup Language), LoRa (Long Range), MQTT (Message Queuing Telemetry Transport), IP/IPv6 (Internet Protocol), IPsec (Internet Protocol Security), iGMP (Internet Group Management Protocol), ICMP (Internet Control Message Protocol), BOOTP (Bootstrap Protocol), DNS (Domain Name System), IMAP (Internet Message Access Protocol), LDAP (Lightweight Directory Access Protocol), MGCP (Media Gateway Control Protocol), NNTP (Network News Transfer Protocol), NTP (Network Time Protocol), POP (Post Office Protocol), RTP (Real-Time Transport Protocol), RTSP (Real Time Streaming Protocol), RIP (Routing Information Protocol), SIP (Session Initiation Protocol), SMTP (Simple Mail Transfer Protocol), SSH (Secure Shell), Telnet, XMPP (Extensible Messaging and Presence Protocol), and/or SDP (Service Discovery Protocol). In addition, any number of transport protocols may be utilized, including, without limitation: the User Datagram Protocol (UDP), Transmission Control Protocol (TCP), and Resource ReSerVation Protocol (RSVP). Furthermore, any number of link layer protocols may be used, including, without limitation: ARP (Address Resolution Protocol), NDP (Neighbor Discovery Protocol), OSTP (On-line Security Transaction Protocol), L2TP (Layer 2 Tunneling Protocol), PPP (Point-to-Point Protocol), MAC (Media Access Control), and/or L2CAP (Logical Link Control and Adaptation Protocol).

For wireless communications, communications protocols may include, for the purpose of illustration rather than limitation: Cellular (e.g., 3G, 4G, 5G), HFC (hybrid fiber coax), PON (passive optic network), OLAN (optical LAN), WiFi (802.11), Bluetooth, Zigbee, IrDa, LoRa, or other suitable protocol. Furthermore, components of the systems described herein may communicate through a combination of wired or wireless paths.

The power source and power management 74 may include an energy storage device, e.g., a battery; a power-generating source, e.g., a photovoltaic cell; or other renewable or non-renewable power source capable of providing sufficient current to power the various components of the sensors 70a, 70b for an extended period of time. Optionally, the sensor 70a, 70b may include an AC to DC converter or DC to DC converter for converting voltage from a 220/120 volt AC or DC outlet to the appropriate battery voltage to run the various components of the sensors 70a, 70b.

The identification indicator 75 may include a sound and/or a visual device provided to enable personnel to identify various sensor states and/or the status, e.g., of the temperature sensing circuit 71, and/or to assist with ascertaining the physical location of the sensor 70a, 70b. Visible signals may be provided, for example, using a variety of light-emitting diodes (LEDs) or other such devices. For example, LEDs emitting a specific color, e.g., green and red, may be included to designate an operational state or status (green) or a non-operational state or status (red). In some variations, the visible signals may flash to designate an on-going and/or potential problem. Audible signals may include a buzzing or beeping sound that can be emitted intermittently or continuously. For example, in the event of a low power condition, the identification indicator 75 may be programmed to emit a periodic beeping sound, similar to that emitted by a residential smoke/carbon monoxide detector.

In some implementations, the identification indicator 75 may also be structured and arranged to emit, when prompted, an audible or visible signal that would enable personnel to find a sensor 70a, 70b located, for example, above ceiling tiles or within unlighted or poorly lit plenum or chase spaces. In some variations, the identification indicator 75 may also be used to provide user feedback, e.g., during power-on self-testing of the sensor 70a, 70b, to signal that one or more of the components of the sensor 70a, 70b is functioning properly.

Figure 4A:
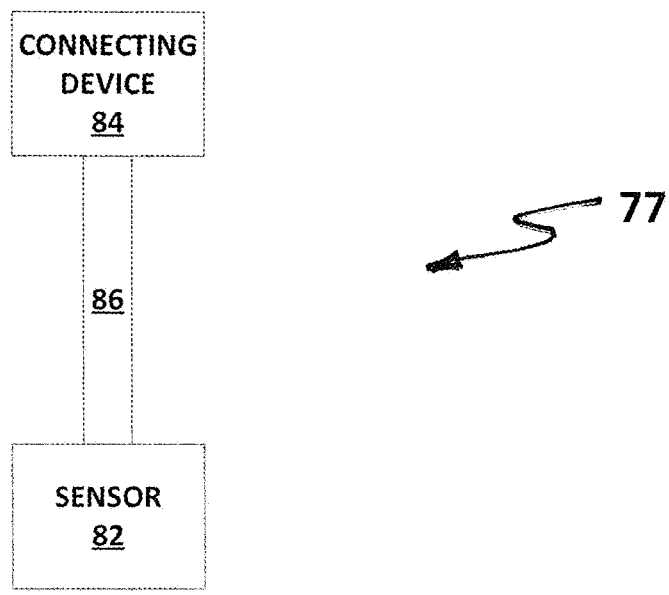
FIG. 4A shows a block diagram of a water leakage sensing circuit in accordance with some embodiments of the present invention.
Figure 4B:
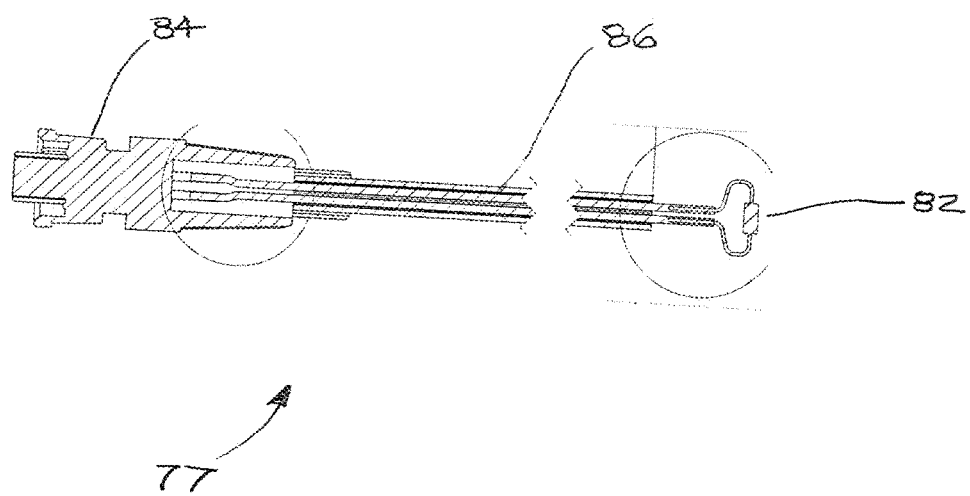
FIG. 4B shows an exemplary water leakage sensing circuit in accordance with some embodiments of the present invention.

In other applications, in addition to continuously or periodically measuring water temperature, the sensor 70a, 70b may, optionally, include a water leakage sensing circuit 77 that may be operationally coupled to the processing device 72 and the power source and power management 74 via the bus/busses 79. Water leakage sensing circuits 77 are well known to the art. FIG. 4A shows a block diagram of a water leakage sensing circuit 77 in accordance with some embodiments of the present invention and FIG. 4B shows an exemplary water leakage sensing circuit 77. The depicted exemplary water leakage sensing circuit 77 may include a sensor 82 operatively coupled to the processing device 72 via a connecting device 84. The connecting device 84 is operatively coupled to the sensor 82 via a plurality of cables or wires 86. Typically, the sensor 82 (e.g., a resistive element) may be placed on or proximate the floor or a horizontal surface, such that, if there is a water leak, pooling water reaches the sensor 82, altering the electrical properties of the sensor signal. Once the sensor signal is altered by the pooling water and further transmitted to the processing device 72 of the sensor 70a, 70b, the processing device 72 becomes aware of the existence of a leak. Although FIGS. 4A and 4B show a hard-wired water leakage sensing circuit 77 that transmits signals from the sensor 82 via a wire cable 86, the sensor 82 may also include a wireless capability to transmit signals to the processing device 72 wirelessly, e.g., using Bluetooth and the like.

Water leaks may also be accompanied by local temperature variations proximate the site of the water leak. As a result, in addition to the temperature sensing circuit 71, in some applications, the sensor 70a, 70b may also include an ambient temperature sensing circuit 76 for the purpose of providing to the processing device 72 signals of ambient temperature measurements. In some variations, the ambient temperature sensing circuit 76 may be placed proximate to but remote from the sensor module.

Optionally, in some instances, the sensor 70a, 70b may include a humidity sensing circuit 78, that is structured and arranged to measure absolute humidity, data from which can be used, in combination with ambient temperature data from the ambient temperature sensing circuit 76, to calculate relative humidity. Those of ordinary skill in the art can appreciate that certain humidity levels produce conditions favorable to possible mold growth, which can create a health hazard.

In some variations, humidity sensing circuits 78 that are capable of measuring the absolute humidity in the air may also be operatively coupled to the processing device 72 and the power source and power management 74 via the bus/busses 79. Humidity sensing circuits 78 are well known to the art. The humidity sensing device 78 may be adapted to generate and transmit (e.g. continuously, periodically, and/or on demand) signals of humidity level measurements to the processing device 72. The processing device 72, in turn, may be configured to include software, an algorithm, a driver program, or the like that is capable of using the sensed absolute humidity data from the humidity sensing device 78 and the sensed ambient temperature data from the ambient temperature sensing circuit 76 to calculate relative humidity levels. After calculating relative humidity levels, the software, algorithm, driver program, or the like can be further configured to compare the calculated relative humidity levels to typical or historical ambient humidity levels. If the difference between the calculated relative humidity level and the typical or historical ambient humidity level exceeds a predetermined value, then this difference may provide indicia of a possible water leak, requiring investigation.

Referring again to FIG. 1, in some applications, water temperature data and other data (e.g., pressure, flow, flow velocity, humidity, leakage, and the like) may be transmitted by the data transmission device 73 of the sensor 70a, 70b to a local or remote processing server 80 via a communication network 90, e.g., a cloud-based network, for processing, storage, and use. In some variations, these data may be transmitted to the communication network 90 via a local gateway 85. Data storage may occur within the cloud architecture, e.g., within the cloud-based communication network 90, and/or at the local or remote processing server 80.

Processing of the received data may include, for the purpose of illustration rather than limitation, one or more of: manipulating the received data to identify data patterns, data signatures, and/or relationships between the data that provide indicia of anomalies; subjecting the data to, e.g., existing or developed, mathematical relationships (e.g., a mean, a mathematical average, a standard deviation, a derivative, or other calculable mathematical relationship) that provide indicia of anomalies; and/or comparing received data to external data such as, for example, weather, occupancy rate of the hotel, the type and number of utilities and/or facilities being used by the hotel, and so forth. Comparison of the received data with the weather may provide a useful relationship(s), such as, larger amounts of hot water may be used during colder days than warmer days, and the like. Comparison of received data with a hotel occupancy rate may provide a useful relationship(s) between the number of guests, the amount of hot water used, the temporal distribution of hot water demand during the course of the day, and the like. Comparison of received data with the type and number of utilities being used may provide a useful relationship(s), such as the amount of hot water used in a shower versus the amount of hot water used in a bath, the amount of hot water used by a rain forest shower head versus the amount of hot water used by a conventional shower head, and so forth. External data for comparison with received data may be stored in one or more external data storage device 92 that may be in communication with the local or remote processing server 80 via the communication network 90. Transmission of data between the local or remote processing server 80 and the external data storage device(s) 92 may be performed wirelessly and/or via a hard-wired communication network 90.

Data, once received, processed, and stored by the local or remote processing server 80 may then be transmitted to, e.g., "pushed," or otherwise accessed by system operators, e.g., "pulled," using processing client devices 95, e.g., a computer 95a, a mobile communication device 95b, and the like. Such transmission may be performed wirelessly and/or via a hard-wired communication network 90. Data pushed to or pulled by, e.g., building management, system operators may include raw or formatted data from which the system operator may perform a review for water event anomalies or, more preferably, for indicia of occurring or impending water event anomalies. Alternatively, data pushed or pulled by system operators may include an alert, a warning, and/or a notification. For example, based on any of the comparisons, rules, data patterns, relationships between data, mathematical relationships (e.g., a mean, a mathematical average, a standard deviation, a derivative, or other calculable mathematical relationship), and the like, under certain circumstances, the local or remote processing server 80 may be adapted to generate and transmit [and] an alert, a warning, and/or a notification, so that maintenance personnel, custodial personnel, and the like may be notified of an existing water event or of an imminent water event, so that corrective action may be taken, respectively, to minimize the deleterious impact of the ongoing water event or to prevent occurrence of the water event. Although, notification of maintenance personnel is key to rectifying the ongoing water event or preventing an impending water event, notification may also include notifying other personnel so that, for example, guests may be notified of the problem and other proactive steps may be taken to assuage or alleviate possible negative reactions by guests.

As used herein, references to a "server(s)," a "computer(s)," a "client device(s)," and/or a "processing device(s)," may include, without limitation, a general purpose computer, a laptop computer, a tablet computer, a mobile communication device, and the like. In some applications, each of these devices may include a central processing unit, a system memory, input/output (I/O) devices, and a system bus that couples various system components including the system memory, the processing unit, and the I/O devices. Each of these devices may employ the central processing unit to execute computer-executable program modules (e.g., applications or apps) stored on one or more computer readable medium forming the system memory. The program modules may include instructions, algorithms, driver programs, routines, objects, components, data structures, and the like that perform particular tasks or implement particular abstract data types.

Each processing device may assume different configurations and still be consistent with the invention, including hand-held wireless devices such as mobile phones or PDAs, tablet computers, iPads, multiprocessor systems, microprocessor-based or programmable consumer electronics, minicomputers, mainframe computers, and the like. The invention may also be practiced in distributed computing environments where tasks are performed by remote processing devices that are linked through a communications network 90. In a distributed computing environment, program modules may be located in both local and remote computer storage media including memory storage devices.

Moreover, as used herein, references to "a module," "modules," "application(s)," "function," and/or "algorithm" generally mean, but are not limited to, a software or hardware component that performs certain tasks. A module may advantageously be configured to reside on an addressable storage medium and be configured to execute on one or more processor. A module may be fully or partially implemented with a general purpose integrated circuit (IC), co-processor, field-programmable gate array (FPGA), or application-specific integrated circuit (ASIC). Thus, a module may include, by way of example, components, such as software components, object-oriented software components, class libraries, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or be further separated into additional components and modules. Additionally, the components and modules may advantageously be implemented on many different platforms, including computers; computer servers; data communications infrastructure equipment, such as application-enabled switches or routers; and/or telecommunications infrastructure equipment, such as public or private telephone switches or private branch exchanges (PBX). In any of these cases, implementation may be achieved either by writing applications that are native to the chosen platform, or by interfacing the platform to one or more external application engine.

Having described a system for monitoring and managing water delivery to users, a method of monitoring and managing water delivery to users using such a system will now be described. For the purpose of illustration and not limitation, in the following description, the users are assumed to be guests in a hotel; however, the invention in not to be construed as being limited to that application. As mentioned in the above description of the system 100, non-invasive temperature sensing circuits 71 of the sensors 70a, 70b thermally and operatively coupled to conduits 305 through which hot water is delivered to a hotel guest(s) via a dedicated conduit loop 40a . . . 40n, e.g., a riser, continuously or periodically measure the temperature of the exterior surface of the conduit 305 and generate and transmit water temperature data signals to a local or remote processing server 80 via a, e.g., cloud-based, communication network 90. Data received by the cloud-based network 90 and/or the local or remote processing server 80 may be processed, stored, and/or manipulated to provide useful information to building management and/or administrative personnel, building custodial and maintenance personnel, hotel guests, third party service providers, and so forth. In addition to processing and manipulating received data for the purpose of providing information to any of the building management and/or administrative personnel, building custodial and maintenance personnel, hotel guests, third party service providers, and so forth, the processed and manipulated data may also be used to interact with and/or provide active control of systems and devices located within the hotel. Information may be broadly interpreted to include, for example, alerts, notifications, warnings, alarms, and the like about water events and, more specifically, anomalies caused or potentially caused by the water events. Systems and devices located within the hotel that, in some embodiments may be actively controlled, can include, without limitation, water heating devices and systems, water delivery devices and systems, security systems (e.g., door locking devices and systems), lighting systems, temperature control systems (e.g., thermostats), HVAC systems, smoke and fire detection devices and systems, motion-detecting systems, CCTV devices and systems, and so forth.

Figure 5:
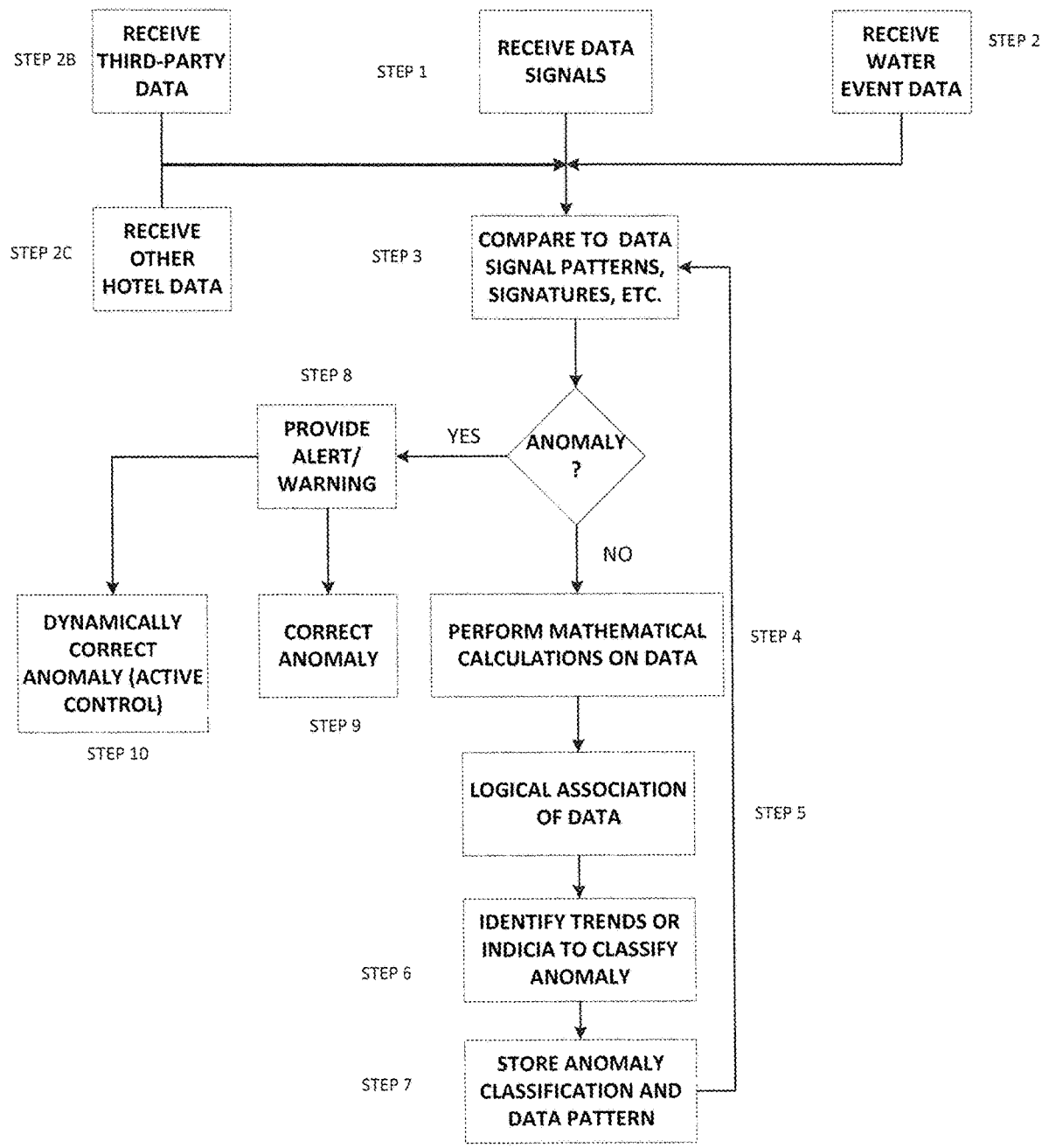
FIG. 5 shows a flow chart of a method of monitoring and managing water delivery to a plurality of users in accordance with some embodiments of the present invention.

Referring to FIG. 5, in a first step, the system controller (e.g., the processing server) may receive and store sensed data signals from the temperature sensing circuits and other sensing circuits associated with the sensors within a data collection system (STEP 1). Although one embodiment of the invention may involve receiving and storing water temperature and ambient temperature data from the sensors, those of ordinary skill in the art can appreciate that other data (e.g., water pressure, water flow, water flow velocity, absolute humidity, water leakage, and the like) may also be received and stored for similar, related, or other purposes. The data collection system of the system controller may also receive and store data relating to the occurrence of a water event (STEP 2A). Whereas the data signals from the temperature sensing circuits of the sensors may be provided dynamically, data relating to the occurrence of a water event may be provided manually, for example, by a hotel guest complaining about a water event (e.g., insufficient hot water, lack of water pressure, and the like) or by custodial or maintenance personnel responding to a complaint from a hotel guest. Such data may include the date and time of occurrence of the water event; the location(s) (e.g., room(s) and riser(s)) affected by the water event; a description of the cause of the water event (i.e., the anomaly associated with the water event); and so forth.

Although, in one embodiment of the present invention, water event data are received (STEP 2A), alternatively, or in addition, data from other sources may be received and stored (STEP 2B, STEP 2C). For example, data collected from other (e.g., third party) sources (STEP 2B) may include, for the purpose of illustration rather than limitation: local weather data, hotel occupancy data, average daily occupancy rate tracking data, and so forth. Data collected from other sources within the hotel (STEP 2C) may include security system data (e.g., door locking devices and systems), lighting system data, temperature control system data (e.g., thermostats), HVAC system data, smoke and fire detection device and system data, motion-detecting system data, CCTV device and system data, guest complaint system, and so forth.

For the purpose of illustration and not limitation, a water event may include conditions in which the hot water delivered to a hotel guest is not hot enough (e.g., less than 115° F.), conditions in which the hot water delivered to a hotel guest is too hot (e.g., greater than 130° F.), conditions in which an insufficient volume of hot water is delivered to a hotel guest, conditions in which the water temperature in one riser or group of risers differs appreciably from the water temperature in another riser or group of risers, and combinations thereof.

In a next step, the sensed water temperature data may be compared with stored sensed data patterns, data signatures, and/or relationships between data that previously or historically have been attributed to and classified with a particular anomaly (STEP 3). For example, data signal patterns, data signatures, and/or relationships between data may include changes in water temperature that occurred concurrent with or prior to the occurrence of a water event anomaly. More specifically, the temporal patterns, signatures, and/or relationships of the changing temperature leading up to the water event anomaly may be used as indicia of the water event anomaly. Advantageously, as a result, comparison of current water temperature data with historic data patterns, data signatures, and/or relationships that are known to have preceded a water event anomaly (STEP 3) may be used to predict occurrence of the water event anomaly or, alternatively, may be used to confirm that the water event anomaly is presently occurring.

If the comparison does not identify a known or historic anomaly that can be associated with patterns, signatures, and/or relationships between data associated with sensed water temperature data, then the system controller may be structured and arranged to manipulate the data to perform mathematical calculations on the data (STEP 4) to develop mathematical relationships (e.g., a mean, a mathematical average, a standard deviation, a derivative, or other calculable mathematical relationship) that may be used as indicia of a water event anomaly for the purpose of comparison.

If the comparison still does not identify a known or historic anomaly that can be associated with patterns, signatures, and/or relationships between data associated with sensed water temperature data (STEP 3), in addition to, or as an alternative to, the mathematical calculations (STEP 4), the system controller may be structured and arranged to review the temporal relationship of the sensed water temperature data for the purpose of associating that data with a new anomaly. More specifically, the system controller may be adapted to use artificial intelligence and/or machine learning software, programs, algorithms, and the like to logically associate the sensed water temperature data from the various sensors disposed at discrete locations, e.g., on a specific return conduit, on a specific supply conduits, on a specific riser, and so forth, with the water event occurrence (STEP 5). In some implementations, the aim of the logical association may be to identify any trends or indicia within the patterns, signatures, and/or relationships between the sensed water temperature data and other data that may presage occurrence of a water event anomaly (STEP 6). Such trends or indicia may pertain to a first sensor or set of first sensors located at a particular or discrete location(s) to the exclusion of a second sensor or set of sensors located at a different location(s). Alternatively, or in addition, logical association may include, for the purpose of illustration rather than limitation, using the resulting mathematical calculations and relationships (STEP 4) to identify any trends or indicia that may presage occurrence of a water event anomaly.

Such identification may include, for the purpose of illustration and not limitation, classifying the water event occurrence as an anomaly for which a corresponding pattern, signature, and/or relationship between sensed water temperature data and/or discrete mathematical relationship preceded or accompanied the anomaly (STEP 6). The corresponding pattern, signature, and/or relationship of sensed water temperature data and/or discrete mathematical relationship that preceded or accompanied the anomaly may be stored, e.g., in memory provided for that purpose, in a look-up table, and the like (STEP 7). Advantageously, the corresponding pattern, signature, and/or relationship of sensed water temperature data and/or discrete mathematical relationship that preceded or accompanied the water event anomaly can be used as a tool to predict occurrence of potential water event anomalies and, moreover, to train the system controller to use artificial intelligence to identify warnings signs (e.g., hot water temperatures across the system) of an approaching or ongoing water event anomaly. As more and more patterns, signature, and/or relationships of sensed water temperature data and/or discrete mathematical relationship are associated with anomalies, subsequent sensed water temperature data signals from the sensors may, in real-time, be received, processed, and compared to the stored patterns, signatures, and/or relationships of water event anomalies and/or discrete mathematical relationship.

If, in the alternative, the data signal pattern, signature, and/or relationship comparison determines, with a reasonable degree of certainty, that the pattern, signature, and/or relationship of the currently-sensed water temperature data signals is similar or substantially similar (e.g., using a weighted score) to a stored pattern, signature, and/or relationship of sensed water temperatures that typically precedes or accompanies a known water event anomaly, then the system controller may reasonably conclude that the anomaly may or is likely to occur at some point in the future or may be occurring contemporaneously. Aware of the on-going occurrence or the likelihood of an occurrence of the anomaly, the system controller may provide (e.g., generate and transmit) notifications, warnings, and/or alerts to operators, maintenance personnel, management personnel, and the like (STEP 8), so that the person(s) notified may proactively take corrective or remedial action to address the ongoing anomaly and/or to prevent the anomaly from occurring (STEP 9).

Figure 6A:
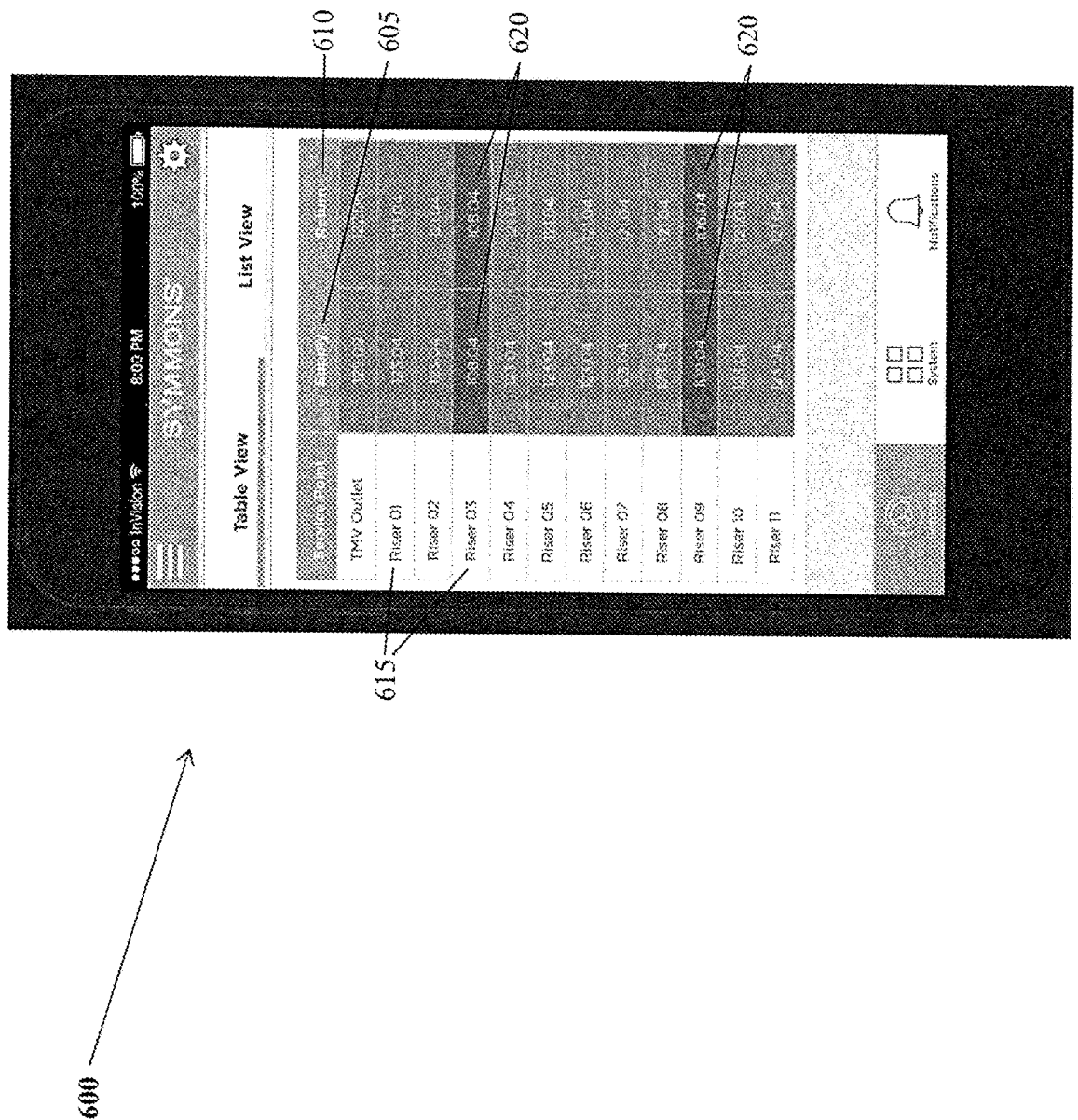
FIG. 6A shows an illustrative embodiment of a graphical user interface (GUI) on a mobile communication device depicting a summary of current conditions (e.g., water temperature data) within a plumbing system in accordance with some embodiments of the present invention.
Figure 6B:
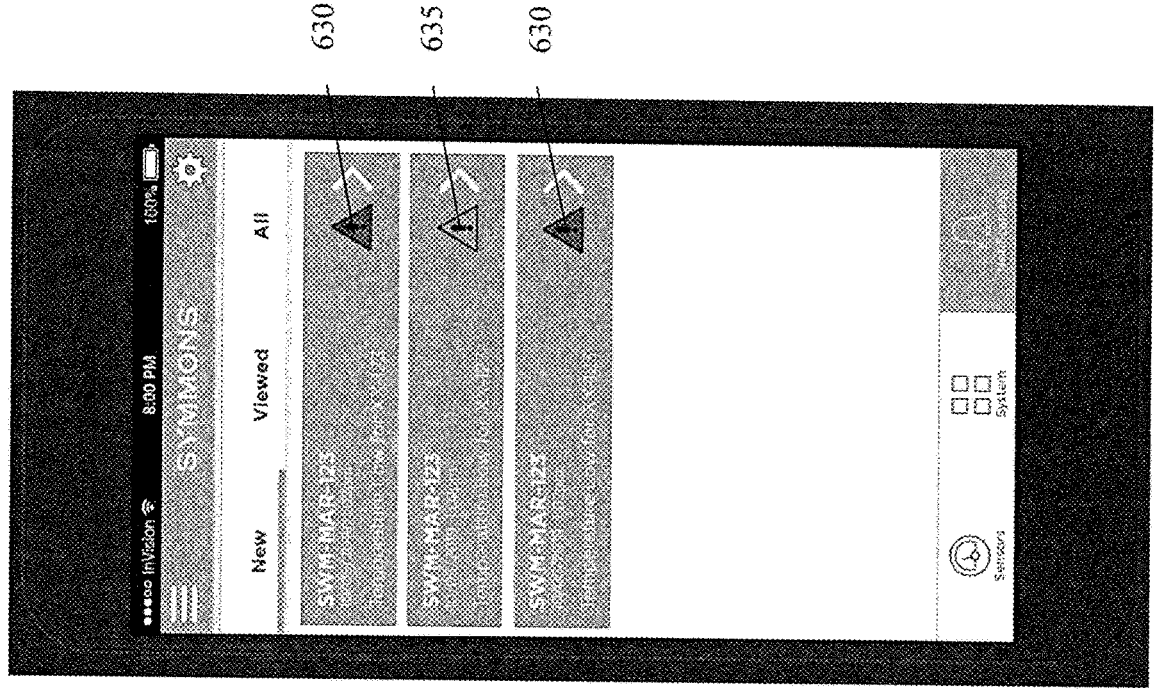
FIG. 6B shows a first illustrative embodiment of a GUI depicting a warning/alert message received by a mobile communication device in accordance with some embodiments of the present invention.
Figure 6C:
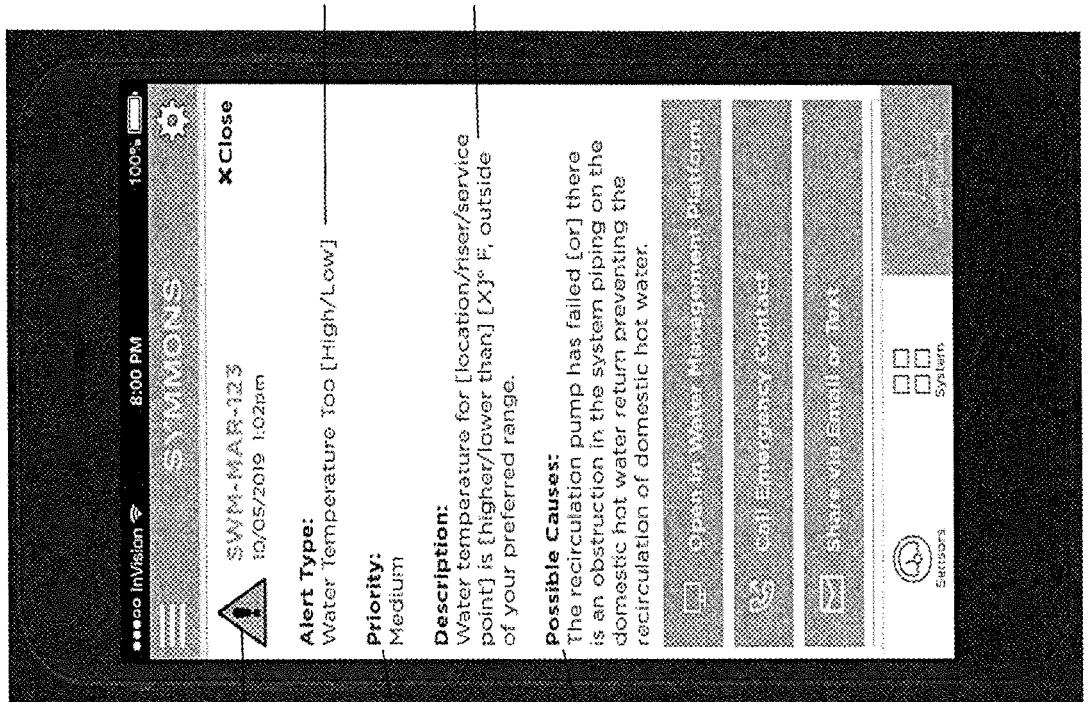
FIG. 6C shows a second illustrative embodiment of a GUI depicting a warning/alert message received by a mobile communication device in accordance with some embodiments of the present invention.

FIGS. 6A-6C show screen shots of illustrative embodiments of summarized data, notifications, warnings, and/or alerts that may be generated and transmitted to, for example, the mobile communication devices 600 of maintenance personnel, hotel management personnel, and so forth. The messages and data may be transmitted manually or automatically and can include status confirmation messages; "good-to-go" messages; informational notices, e.g., that the system is down (or will be down) for maintenance; reminder messages to the hotel management personnel to re-subscribe to these services, and so forth.

Those skilled in the art can appreciate that there are a myriad of ways to pattern the design of data summaries, notifications, warnings, and/or alert; hence, the screen shots in FIGS. 6A-6C are merely illustrative. The screen shot of the mobile communication devices 600 in FIG. 6A, for example, shows an embodiment of a summary of water temperature data for the input and output of a thermostatic mixing valve (TMV) and for the supply conduit 605 and the return conduit 610 of a plurality of risers (Riser 01 to Riser 11) in a building. If all of the water temperature data were within required or preferred temperature limits, the summarized data in the screen shot 600 could be classified as a "notification," in that the displayed data do not suggest an on-going water event(s). When, on the other hand, some portion of the water temperature data falls outside of preferred or required temperature limits, the summarized data in the screen shot 600 could be classified as a "warning" or an "alert," in that the data suggest an on-going water event(s). In one variation, a "warning" may be suggestive of a likely occurrence of a water event, while an "alert" may be suggestive of an on-going water event.

In one application, referring to FIG. 6A, supply conduit water temperatures 605 and return conduit water temperature 610 may be displayed in a screenshot 600 for a number of closed-loop risers 615 (e.g., Riser 01 to Riser 11). In some variations, water temperatures in the supply line 605 and the return line 610 of each riser 615 may be displayed and, in some applications, color-coded, such that water temperature readings exceeding a predetermined temperature level (e.g., 115° F.) may be displayed in a first color, e.g., red, while temperature readings less than the predetermined temperature level may be shown in a second color, e.g., blue. Because the sensed water temperature measurements associated with the supply 605 and return lines 610 of Riser 03 and Riser 09, respectively, are less than the predetermined temperature level, they may appear in blue 620, while the water temperature readings on all other supply 605 and return lines 610 for the remaining risers may appear in red. In short, at a glance, maintenance personnel, building management personnel, and the like can see that there may be or likely is an issue with the water temperature in both the supply 605 and return 610 lines of Riser 03 and Riser 09.

The screen shot of the mobile communication devices 600' in FIG. 6B shows an alternative and additionally detailed embodiment of a warning or alert message. In this variation, an "alert" may indicate a more serious problem or a problem with a higher priority than a "warning," so that, in the event that there are multiple water events occurring contemporaneously, maintenance personnel, building management personnel, and the like may be able, at a glance, to prioritize work effort and resources. In FIG. 6B, individual water temperature readings for the supply water temperatures 605 and return water temperature 610 for each closed-loop risers 615 are not shown (as they are in FIG. 6A); but, rather, the warning or alert may include a short message and a priority icon, e.g., to indicate that the water temperature in a supply line and/or a return line of a specific riser is too low. Color-coded warning signal icons 630, 635 may also be displayed indicating the priority or severity of the anomaly. For example, a red/high priority "alert" signal icon 630 may indicate that the current water temperatures in both the supply and return lines of the identified riser are less than a predetermined temperature level. A yellow/medium priority "warning" signal icon 635 may indicate that the mathematical difference between the current water temperature in the return line of the identified riser and the current water temperature in the supply line of the same riser is greater than, for example, 15° F.

The screen shot of the mobile communication devices 600" in FIG. 6C shows yet another alternative and additionally detailed embodiment of a warning or alert. In FIG. 6C, the message may include an appropriate priority alert/warning signal icon (i.e., a yellow/medium priority "warning" signal icon 635), as well as written descriptions detailing, for example, the alert type 640; the priority 645; a description of the anomaly 650, including, e.g., the location, riser, and/or service point; and a possible cause(s) of the anomaly 655.

Optionally or alternatively, once the system controller has been trained, e.g., using artificial intelligence and/or machine learning, to identify water temperature data patterns, signatures, relationships, and the like and to associate specific anomalies with these patterns, signatures, relationships, and the like, resolution or rectification of the anomalies may be addressed dynamically using active control measures (STEP 10). Preferably, active control and resolution may be initiated at any level of the system and can also include a verification step, as a follow up. Active control measures imply that control includes sensing, analyzing, and controlling functions. Moreover, the sensing, analyzing, and controlling may be by any of the components of the system.

For example, the system controller may be configured to actively control one or more of the heating sources, thermostatic mixing valves, recirculation pumps, booster pumps, and pressure regulating or balancing valves to address the nature and cause of a discrete anomaly. More particularly, after identifying an ongoing or imminent anomaly, the system controller may be able to run an application, driver program, algorithm, and so forth that include transmitting execution instructions to one or more of the heating source, mixing valve, recirculation pumps, and pressure regulating or balancing valves, or other components of the plumbing system.

Figure 7:
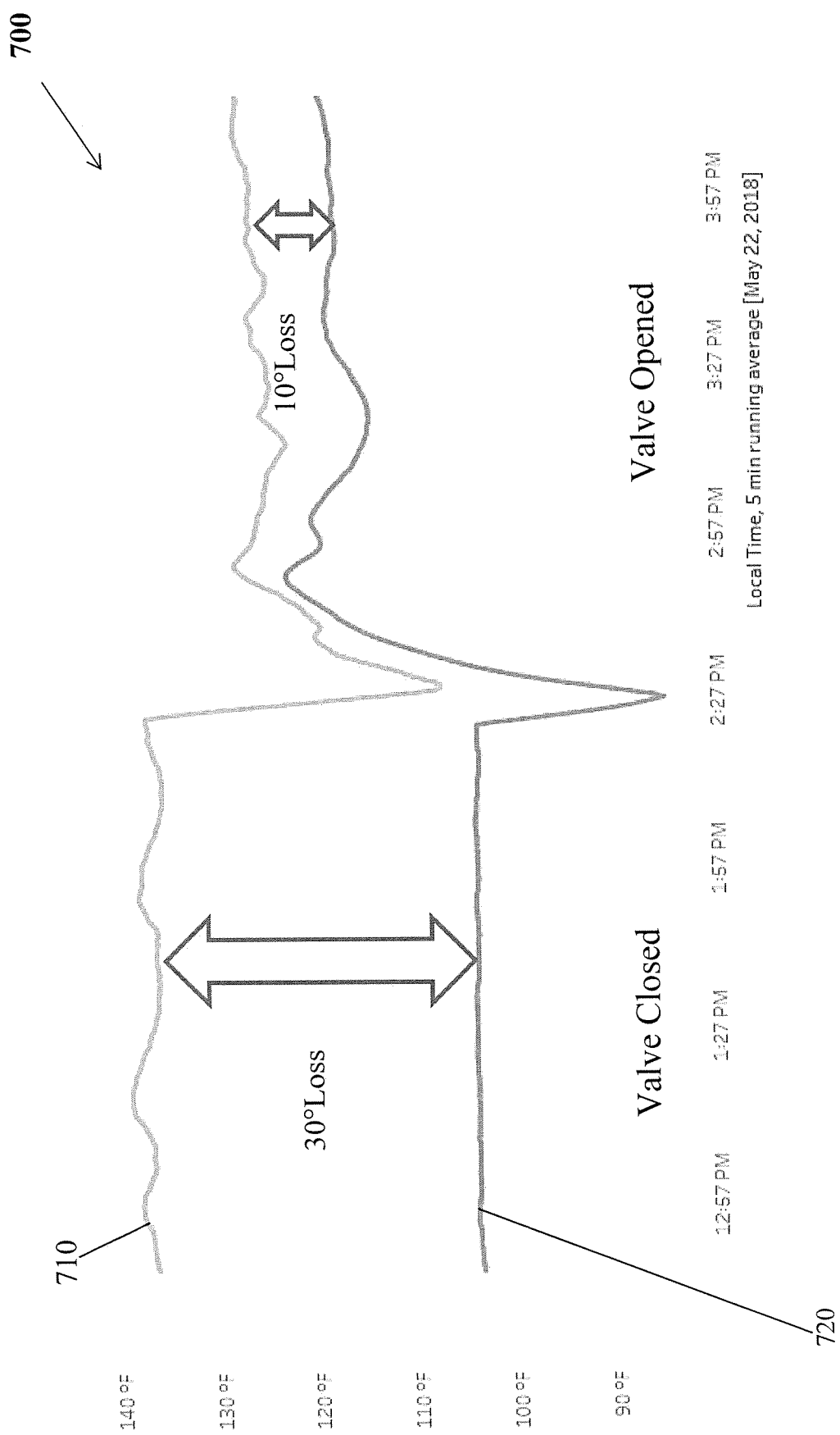
FIG. 7 shows an illustrative embodiment of a GUI depicting water temperature data and a water event anomaly in accordance with some embodiments of the present invention.

Referring to FIG. 7, a method of monitoring and managing water delivery to users for an exemplary anomaly will be described. FIG. 7 provides an illustrative screen shot 700 corresponding to sensed water temperature data for a single riser that experienced a water event anomaly, showing water temperatures for both the supply line 710 and the return line 720 on the ordinate versus time on the abscissa. Because, between at least 12:57 p.m. and 1:57 p.m., the mathematical difference between the water temperatures in the supply line 710 and the return line 720, which is about 30° F., exceeds a desired difference of about 10 to 15° F., the system and corresponding method may be configured or trained to conclude that a water event is occurring. Assuming that this is a recurring water event for which a representative sensed water temperature rule, data pattern, data signature, data relationship, and/or mathematically calculated value, for a corresponding anomaly is stored in memory, a look-up table, and so forth, the system controller of the system and related method may be adapted to compare and match the data pattern, data signature, and/or data relationship of the current sensed water temperature data with stored rules, data patterns, data signatures, data relationships, and/or mathematically calculated value of sensed water temperature data to identify the corresponding anomaly. The corresponding anomaly for the current sensed temperature data pattern suggests a reduction or no flow condition resulting from a closed thermostatic mixing valve.

Having matched the pattern of the sensed water temperature data and identified the anomaly corresponding to the water event as a reduction or no flow condition resulting from a closed valve, the system controller or, alternatively, an operator using a system controller may generate a notification, warning, and/or alert (e.g., using email, using a text, using social media, and so forth) to maintenance personnel, hotel management personnel, custodial personnel, and combinations thereof, informing each of the parties receiving the message of the location (e.g., by riser, by supply/return line, by access point, and so forth), as well as the nature of the anomaly. Depending on the degree of certainty of the nature and/or location of the anomaly, in some variations, a maintenance alert may also include instructions on where and how to repair the anomaly. Advantageously, such instructions may include a bill of materials of repair materials, parts, and the like, as well as a list of tools that may be needed to effect the repairs. In some instances, the maintenance warning or alert may also provide information as to the amount of time and the number of maintenance personnel needed to complete the repair. For the closed valve water event anomaly depicted in FIG. 7, once maintenance or custodial personnel were able to open the closed valve, e.g., at about 2:27 p.m., water temperatures in the supply line 710 and water temperatures in the return line 720 converged and remained at less than 10° F.

Optionally, the system 100 may include active control features whereby the system 100 is capable of generating and transmitting control signals to one or more of the heating sources 10, the mixing valve(s) 30, the pressure regulating or balancing valves 62*a* . . . 62*n*, the booster pumps 64*a* . . . 64*n*, and the recirculation pumps 60*a* . . . 60*n*. Thus, by actively controlling the heating source 10, the system 100 is capable to dynamically adjusting the temperature of the hot water delivered to the system 100. By dynamically adjusting the mixing valve(s) 30, the system 100 is capable of automatically shutting down delivery of water to the system 100 and/or of dynamically adjusting the supply of hot water to all of the risers 40*a* . . . 40*n*. By actively controlling the pressure regulating or balancing valves 62*a* . . . 62*n* and/or the recirculation pumps 60*a* . . . 60*n*, the system 100 is capable of dynamically adjusting the supply of hot water within a discrete riser 40*a* . . . 40*n*, e.g., to adjust each of the risers 40*a* . . . 40*n* to load demand conditions.

Having described herein illustrative embodiments of the present invention, persons of ordinary skill in the art will appreciate various other features and advantages of the invention apart from those specifically described above. It should therefore be understood that the foregoing is only illustrative of the principles of the invention, and that various modifications and additions can be made by those skilled in the art without departing from the spirit and scope of the invention. Accordingly, the appended claims shall not be limited by the particular features that have been shown and described, but shall be construed also to cover any obvious modifications and equivalents thereof.

What we claim is:

1. A system for monitoring and managing water delivered to a plurality of users hydraulically connected via a dedicated conduit loop to a water supply source and a water heating unit via the dedicated conduit loop, the system comprising:
   at least one mixing valve hydraulically connected to the dedicated conduit loop;
   a first set of sensing devices operatively coupled to an input and an output of the mixing valve, wherein each sensing device of the first set is adapted to generate and transmit sensed data signals;
   a recirculation pump hydraulically coupled to the dedicated conduit loop;
   a second set of sensing devices operatively coupled to selected portions of the dedicated conduit loop, wherein each sensing device of the second set is adapted to generate and transmit sensed data signals and wherein the dedicated conduit loop comprises a riser and the selected portion of the dedicated conduit loop comprise a supply conduit and a return conduit;
   a pressure regulating or balancing device hydraulically coupled to the dedicated conduit loop;
   a data collection system for receiving and storing sensed data transmitted by the first set of sensing devices and the second set of sensing devices; and a system controller for:
     comparing sensed data with at least one of rules, data patterns, data signatures, or a value calculated mathematically associated with a plurality of water event anomalies; and
     generating and transmitting at least one of a notification, a warning, or an alert if the comparison of sensed data and the rules, data patterns, data signatures, or value calculated mathematically is suggestive of a water event anomaly.

2. The system of claim 1, wherein the system controller further controls operation of the recirculation pump to control movement of water through the mixing valve.

3. The system of claim 1, wherein the system controller further controls operation of the pressure regulating or balancing device to control flow or pressure in the dedicated conduit loop.

4. The system of claim 1, wherein each of the first set of sensing devices and the second set of sensing devices is adapted to sense a temperature in water flowing within a conduit.

5. The system of claim 1, wherein each of the first set of sensing devices and the second set of sensing devices comprises:
   a processing device having memory for storing water temperature data;
   a water temperature measuring circuit operatively coupled to the processing device and adapted to provide sensed water temperature data to the processing device; and
   a transmitting and receiving device operatively coupled to the processing device, wherein the transmitting and receiving device is structured and arranged to generate and transmit water temperature data signals.

6. The system of claim 5, wherein the water temperature measuring circuit is thermally couplable to an outer surface of a conduit.

7. The system of claim 5, wherein the water temperature measuring circuit is inserted within water flowing through the conduit.

8. The system of claim 5, wherein each of the first set of sensing devices or the second set of sensing devices further comprises:
a temporary power source operatively coupled to the processing device; and an indicator operatively coupled to the processing device.

9. The system of claim 5, wherein at least one of the first set of sensing devices or the second set of sensing devices further comprises a water leakage sensing device operatively coupled to the processing device.

10. The system of claim 5, wherein at least one of the first set of sensing devices or the second set of sensing devices further comprises a humidity sensing device operatively coupled to the processing device.

11. The system of claim 5, wherein the processing device includes memory for storing at least one of ambient temperature data, ambient humidity data, water pressure data, or water (leak) detection data.

12. The system of claim 1 further comprising an ambient temperature sensing device operatively coupled to the processing device.

13. The system of claim 1 further comprising a user interface operatively coupled to the data collection system and to the system controller via at least one communication network.

14. The system of claim 13, wherein the user interface is structured and arranged to:
modify at least one of a configuration, a function, or a parameter of at least one of the first set of sensing devices or the second set of sensing devices;
enabling at least one of the first set of sensing devices or the second set of sensing devices;
disabling at least one of the first set of sensing devices or the second set of sensing devices;
installing at least one of the first set of sensing devices or the second set of sensing devices;
uninstalling at least one of the first set of sensing devices or the second set of sensing devices; and
viewing sensed data from at least one of the first set of sensing devices or the second set of sensing devices.

15. The system of claim 1 further comprising at least one external data storage device for storing data from other sources.

16. The system of claim 15, wherein the data comprise one or more of: local weather data, hotel occupancy, guest complaints, or average daily occupancy rate tracking data.

17. The system of claim 1, wherein each dedicated conduit loop comprises:
a delivery line hydraulically coupled to an outlet of the mixing valve; and
a return line hydraulically coupled to the delivery line and to the water heating unit.

18. The system of claim 17, wherein the second set of sensing devices comprises:
a plurality of first sensors, each first sensor operatively coupled to a corresponding delivery line of a respective conduit loop; and
a plurality of second sensors, each second sensor operatively coupled to a corresponding return line of the respective conduit loop.

19. A method of installing a system for monitoring and managing water delivered to a plurality of users hydraulically connected to a water supply source and a water heating unit via a dedicated conduit loop hydraulically coupled to a recirculation pump and a pressure regulating or balancing device, the method comprising:
operatively coupling a first set of sensing devices to an input and an output of at least one mixing valve, each sensing device of the first set of sensing devices comprising a corresponding signal transmitting device for generating and transmitting sensed data signals;
operatively coupling a second set of sensing devices to selected portions of the dedicated conduit loop, each sensing device of the second set of sensing devices comprising a corresponding signal transmitting device for generating and transmitting sensed data signals, wherein the dedicated conduit loop comprises a riser and the selected portion of the dedicated conduit loop comprise a supply conduit and a return conduit;
providing a data collection system for storing received sensed data signals; and
providing a system controller for:
comparing sensed data with at least one of rules, a corresponding data pattern, a corresponding data signature, a corresponding relationship between data, or a value calculated mathematically associated with a plurality of water event anomalies; and
generating and transmitting at least one of a notification, a warning, or an alert if the comparison of sensed data and the rules, the corresponding data pattern, the corresponding data signature, the corresponding relationship between data, or the value calculated mathematically is suggestive of a water event anomaly.

* * * * *